United States Patent
Miura

(10) Patent No.: US 11,966,327 B2
(45) Date of Patent: Apr. 23, 2024

(54) MEMORY SYSTEM

(71) Applicant: Kioxia Corporation, Tokyo (JP)

(72) Inventor: Takeshi Miura, Kamakura Kanagawa (JP)

(73) Assignee: Kioxia Corporation, Tokyo (JP)

(*) Notice: Subject to any disclaimer, the term of this patent is extended or adjusted under 35 U.S.C. 154(b) by 3 days.

(21) Appl. No.: 17/885,334

(22) Filed: Aug. 10, 2022

(65) Prior Publication Data

US 2023/0236963 A1     Jul. 27, 2023

(30) Foreign Application Priority Data

Jan. 26, 2022   (JP) ................................ 2022-010109

(51) Int. Cl.
  *G06F 12/00*       (2006.01)
  *G06F 3/06*        (2006.01)
  *G06F 12/02*       (2006.01)

(52) U.S. Cl.
  CPC .......... *G06F 12/0246* (2013.01); *G06F 3/061* (2013.01); *G06F 3/0655* (2013.01); *G06F 3/0679* (2013.01)

(58) Field of Classification Search
  CPC .... G06F 12/0246; G06F 3/061; G06F 3/0655; G06F 3/0679; G06F 2212/1008; G06F 2212/1024; G06F 2212/7205; G06F 2212/7208; G06F 3/0611; G06F 2212/7201; G06F 2212/7209; G06F 3/0659

USPC ......................................................... 711/154
See application file for complete search history.

(56) References Cited

U.S. PATENT DOCUMENTS

| 8,832,333 B2 * | 9/2014 | Morita ................ G06F 13/1673 710/33 |
| 9,430,376 B2 | 8/2016 | Horn |
| 10,503,412 B2 | 12/2019 | Lai et al. |
| 2017/0148501 A1 * | 5/2017 | Son ......................... G06F 3/065 |

FOREIGN PATENT DOCUMENTS

| CN | 113571114 A | * | 10/2021 | ......... G11C 11/5628 |
| JP | 5183662 B2 | | 4/2013 | |
| JP | 6266019 B2 | | 1/2018 | |
| KR | 20070089460 A | * | 8/2007 | |

* cited by examiner

*Primary Examiner* — Mardochee Chery
(74) *Attorney, Agent, or Firm* — Foley & Lardner LLP

(57) ABSTRACT

According to one embodiment, a memory system includes nonvolatile memory including a plurality of memory areas and a memory controller. A read operation includes a first operation of reading data from a memory cell array and a second operation of transmitting at least a part of the read data to the memory controller. The memory controller determines, when executing the read operation in a first memory area and a second memory area in parallel, priorities of the second operation in the first memory area and the second operation in the second memory area based on a result of comparison between (A) a first total time period of the read operation in the first memory area and (B) a second total time of the read operation in the second memory area.

20 Claims, 15 Drawing Sheets

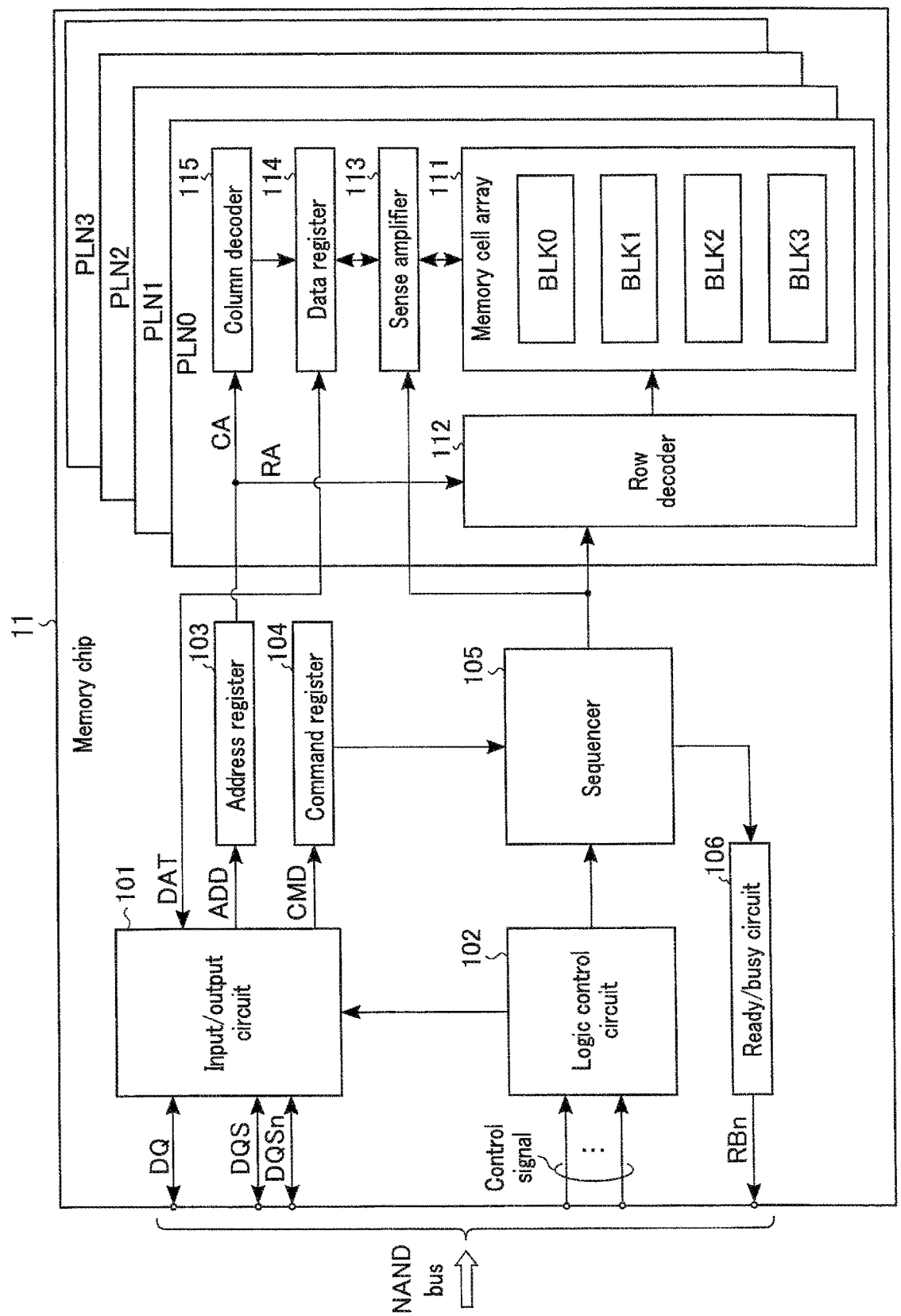
F I G. 2

| Log # | NAND address | | | LBA |
|---|---|---|---|---|
| | BLK | PG | CT | |
| 0 | 100 | 0 | 0 | 0x1000 |
| 1 | 100 | 0 | 1 | 0x1008 |
| 2 | 100 | 0 | 2 | 0x1010 |
| 3 | 100 | 0 | 3 | 0x1018 |
| 4 | 100 | 1 | 0 | 0x1008 |
| ⋮ | ⋮ | ⋮ | ⋮ | ⋮ |

| LBA | NAND address | | |
|---|---|---|---|
| | BLK | PG | CT |
| 0x1000 | 100 | 0 | 0 |
| 0x1008 | 100 | 1 | 0 |
| 0x1010 | 100 | 0 | 2 |
| 0x1018 | 100 | 0 | 3 |
| ⋮ | ⋮ | ⋮ | ⋮ |

FIG. 6

| NAND address | | |
|---|---|---|
| BLK | PG | CT |
| 100 | 0 | 0 |
| 100 | 1 | 0 |
| 100 | 0 | 2 |
| 100 | 0 | 3 |
| ⋮ | ⋮ | ⋮ |

FIG. 7

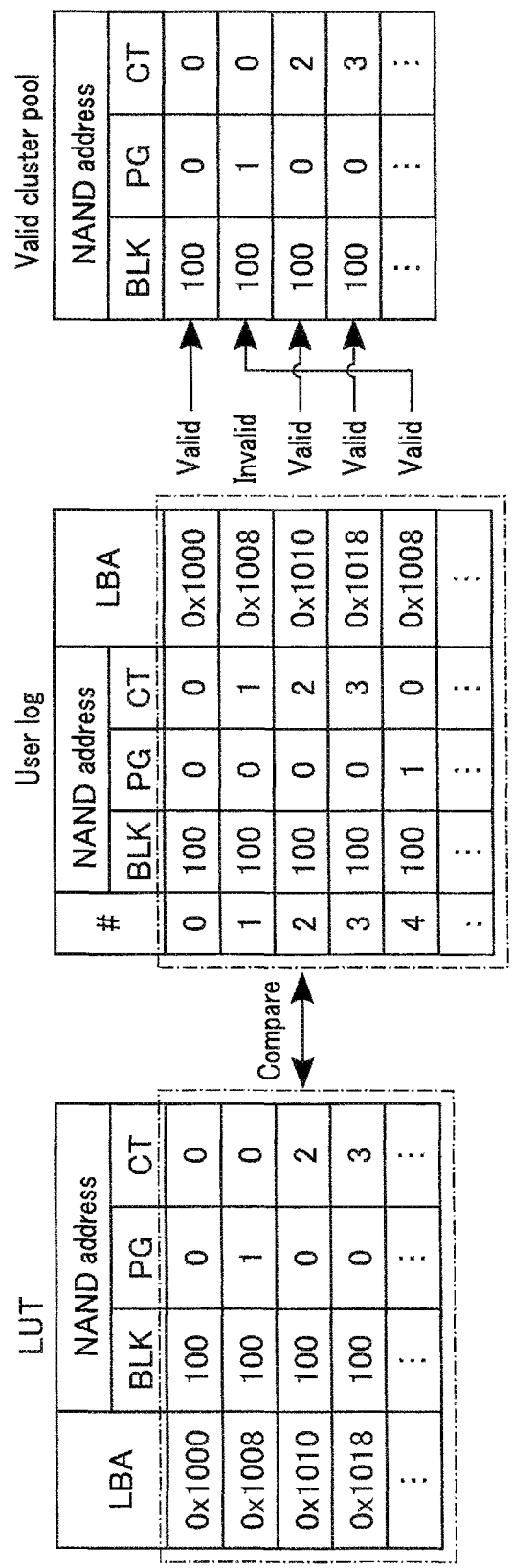
F I G. 8

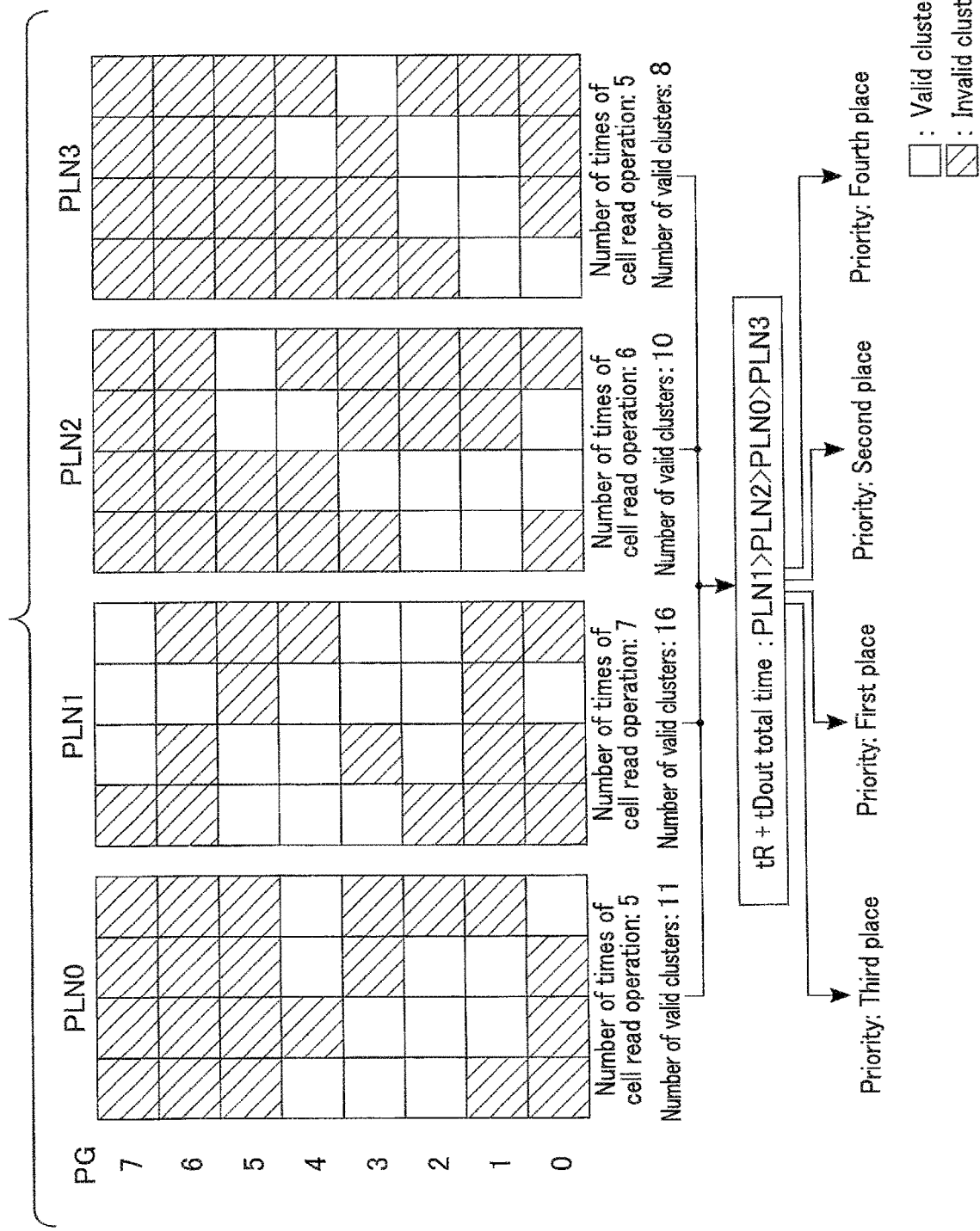
F I G. 9

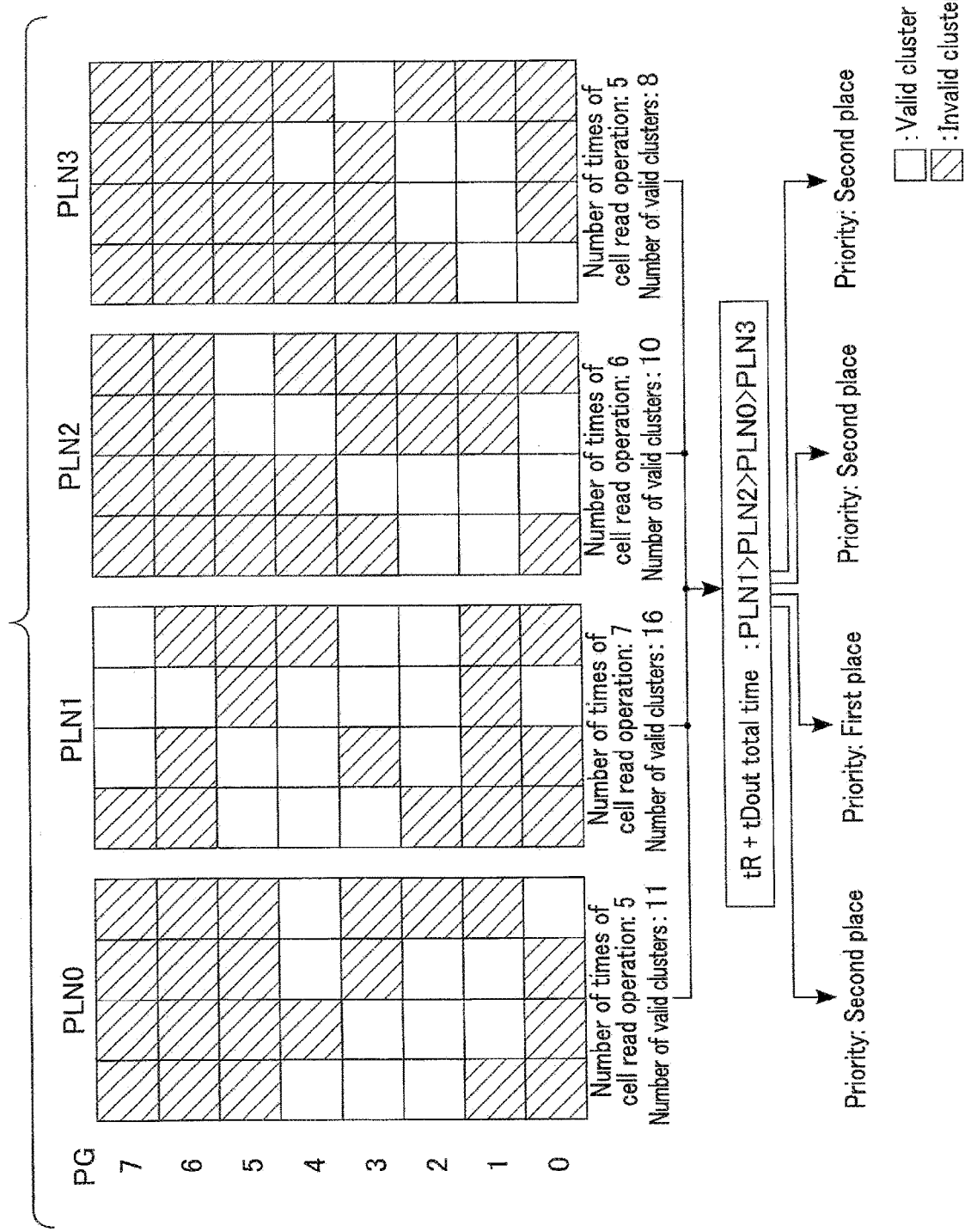
F I G. 12

| Command | NAND address | | |
|---|---|---|---|
| | Chip | PLN | PG |
| Read(A) | 0 | 0 | 0 |
| Read(B) | 1 | 1 | 1 |
| Read(C) | 1 | 0 | 0 |
| Read(D) | 0 | 0 | 0 |
| Write(E) | 1 | 0 | 0 |
| Read(F) | 1 | 1 | 0 |
| Read(G) | 1 | 0 | 0 |
| Read(H) | 0 | 0 | 1 |
| Read(I) | 1 | 0 | 0 |
| Read(J) | 0 | 1 | 0 |
| ⋮ | ⋮ | ⋮ | ⋮ |

FIG. 15

MEMORY SYSTEM

CROSS-REFERENCE TO RELATED APPLICATIONS

This application is based upon and claims the benefit of priority from Japanese Patent Application No. 2022-010109, filed Jan. 26, 2022, the entire contents of which are incorporated herein by reference.

FIELD

Embodiments described herein relate generally to a memory system.

BACKGROUND

As a memory system, a solid state drive (SSD) that includes a nonvolatile semiconductor memory such as NAND flash memory is known.

BRIEF DESCRIPTION OF THE DRAWINGS

FIG. 2 is a block diagram illustrating a basic configuration of a memory chip included in the memory system according to the first embodiment;

FIG. 6 is a diagram illustrating an example of a lookup table in the memory system according to the first embodiment;

FIG. 7 is a diagram illustrating an example of a valid cluster pool in the memory system according to the first embodiment;

FIG. 8 is a diagram illustrating a specific example of generation of the valid cluster pool in the memory system according to the first embodiment;

FIG. 9 is a diagram illustrating a specific example of determination of priority in the memory system according to the first embodiment;

FIG. 12 is a diagram illustrating a specific example of determination of priority in a memory system according to a second embodiment;

FIG. 15 is a diagram illustrating a specific example of a command queue in the memory system according to the third embodiment;

DETAILED DESCRIPTION

Figure 1:
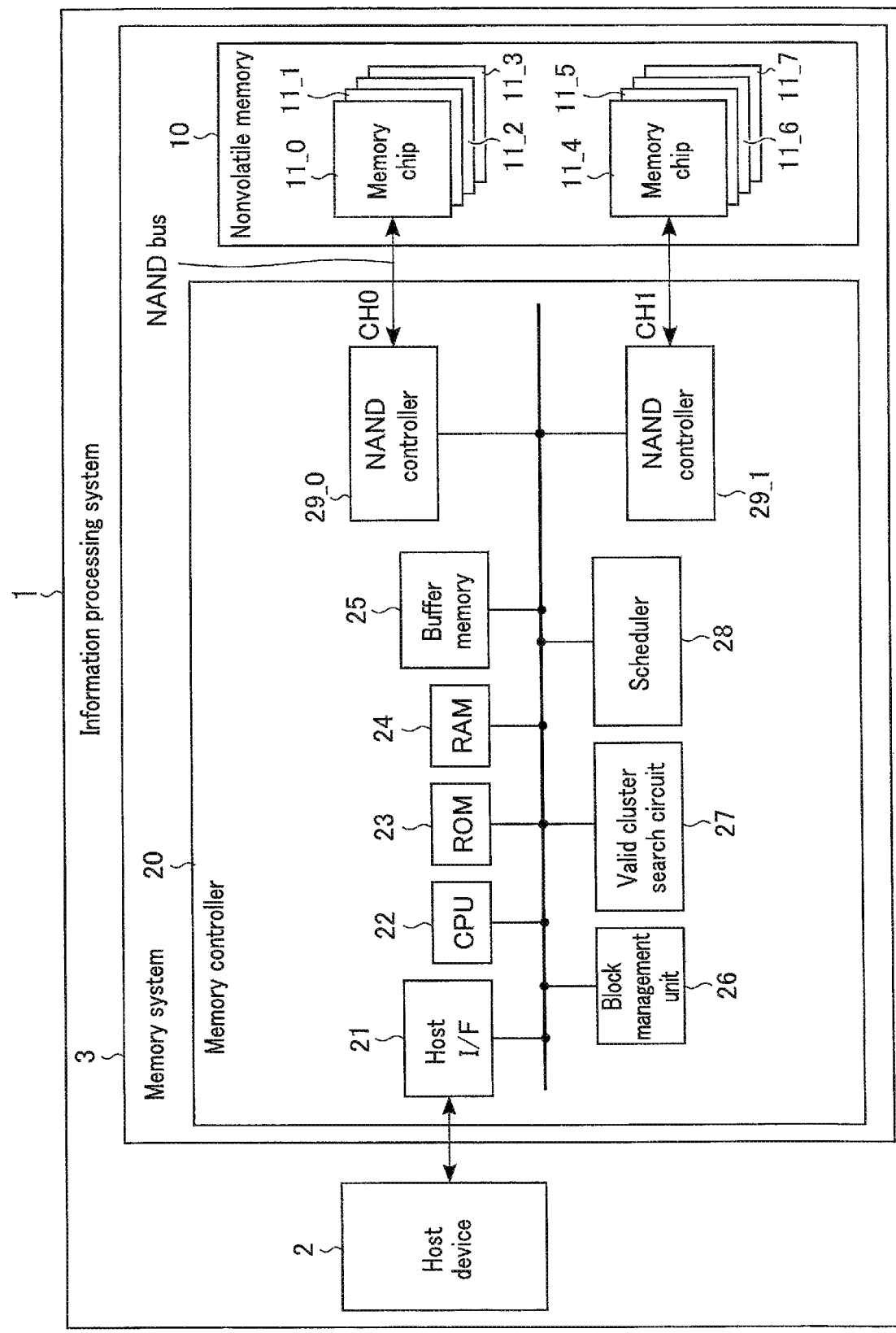
FIG. 1 is a block diagram illustrating an example of an overall configuration of an information processing system that includes a memory system according to a first embodiment.

In general, according to one embodiment, a memory system includes: a nonvolatile memory that includes a plurality of memory areas including at least a first memory area and a second memory area different from the first memory area, each of the plurality of memory areas including a memory cell array; and a memory controller configured to control the nonvolatile memory. A read operation includes a first operation of reading data from the memory cell array and a second operation of transmitting at least a part of the read data from the nonvolatile memory to the memory controller. The memory controller is configured to, when executing the read operation in the first memory area and the read operation in the second memory area in parallel, determine priorities of the second operation in the first memory area and the second operation in the second memory area, based on a result of comparison between (A) a first total time period required for the first operation and the second operation in the first memory area and (B) a second total time period required for the first operation and the second operation in the second memory area.

Hereinafter, embodiments will be described with reference to the drawings. The drawings are schematic. Note that, in the following description, constituent elements having substantially the same functions and configurations are denoted by the same reference numerals. Numbers after the characters constituting the reference numerals are used to distinguish elements having similar configurations.

Hereinafter, the memory systems according to the embodiments will be described.

1 First Embodiment

1.1 Configuration 1.1.1 Configuration of Information Processing System

First, an example of a configuration of an information processing system 1 will be described with reference to FIG. 1. FIG. 1 is a block diagram illustrating an example of an overall configuration of the information processing system 1.

As illustrated in FIG. 1, the information processing system 1 includes a host device 2 and a memory system 3. A plurality of memory systems 3 may be coupled to the host device 2. A plurality of host devices 2 may be coupled to the memory system 3.

The host device 2 is an information processing apparatus (computing device) that accesses the memory system 3. The host device 2 controls the memory system 3.

More specifically, for example, the host device 2 requests (instructs) the memory system 3 to perform a write operation or a read operation of data (hereinafter, referred to as "user data").

The memory system 3 is, for example, a solid state drive (SSD). The memory system 3 is coupled to the host device 2.

1.1.2 Configuration of Memory System

Next, an example of a configuration of the memory system 3 will be described.

As illustrated in FIG. 1, the memory system 3 includes a nonvolatile memory 10 and a memory controller 20.

The nonvolatile memory 10 is a nonvolatile storage medium. The nonvolatile memory 10 stores data received from the memory controller 20 in a nonvolatile manner. Hereinafter, a case where the nonvolatile memory 10 is a NAND flash memory will be described. Note that the nonvolatile memory 10 may be a nonvolatile storage medium other than the NAND flash memory.

The memory controller 20 is, for example, a system-on-a-chip (SoC). In response to a request (instruction) from the host device 2, the memory controller 20 instructs the nonvolatile memory 10 to perform a read operation, a write operation, a data erase operation, or the like. In addition, the memory controller 20 manages a memory space of the nonvolatile memory 10.

Next, an internal configuration of the nonvolatile memory 10 will be described. The nonvolatile memory 10 includes a plurality of memory chips 11. In the example illustrated in FIG. 1, the nonvolatile memory 10 includes eight memory chips 11_0 to 11_7. Hereinafter, in a case where the memory chips 11_0 to 11_7 are not distinguished from each other, it is simply referred to as the "memory chip 11". Note that the number of memory chips 11 included in the nonvolatile memory 10 is not limited.

The memory chip 11 is, for example, a semiconductor chip on which NAND flash memory is mounted. The memory chip 11 stores data in a nonvolatile manner. The plurality of memory chips 11 can operate independently of each other. The memory chip 11 is coupled to the memory controller 20 via a NAND bus. In the example illustrated in FIG. 1, two NAND buses are provided. Then, four memory chips 11_0 to 11_3 are coupled to the NAND bus corresponding to a channel CH0. The other four memory chips 11_4 to 11_7 are coupled to the NAND bus corresponding to a channel CH1. Note that the number of NAND buses and the number of memory chips 11 coupled to a NAND bus are not limited.

Next, an internal configuration of the memory controller 20 will be described. The memory controller 20 includes a host interface circuit (host I/F) 21, a central processing unit (CPU) 22, a read only memory (ROM) 23, a random access memory (RAM) 24, a buffer memory 25, a block management unit 26, a valid cluster search circuit 27, a scheduler 28, and one or more NAND controllers 29. These circuits are coupled to each other by, for example, a bus. Note that the functions of the host interface circuit 21, the block management unit 26, the valid cluster search circuit 27, the scheduler 28, and the NAND controller 29 may be implemented by a dedicated circuit or may be implemented by the CPU 22 executing firmware.

The host interface circuit 21 is an interface circuit coupled to the host device 2. The host interface circuit 21 controls communication according to an interface standard between the host device 2 and the memory controller 20. The host interface circuit 21 transmits a request and user data received from the host device 2 to the CPU 22 and the buffer memory 25, respectively. In addition, the host interface circuit 21 transmits user data in the buffer memory 25 to the host device 2 in response to an instruction from the CPU 22.

The CPU 22 is a processor. The CPU 22 controls the entire operation of the memory controller 20. For example, the CPU 22 instructs the nonvolatile memory 10 to perform a write operation, a read operation, and a data erase operation based on a request from the host device 2.

In addition, the CPU 22 executes various processing for managing the nonvolatile memory 10, such as garbage collection, refresh, and wear leveling.

The garbage collection is also referred to as compaction. The garbage collection is a process of reading (collecting) valid data from a plurality of blocks and rewriting (copying) the valid data into another block. A block from which all valid data has been copied by garbage collection is in an erasable state. For example, the data erase operation in the nonvolatile memory 10 is executed for each data area called "block". On the other hand, the write operation and the read operation of the data are executed in units of data called "pages". The block includes a plurality of pages. Therefore, the unit of data erase operation is different from the unit of writing and reading of data. When data is rewritten in the nonvolatile memory 10, new data is written in another memory element (page). Thus, as the data is rewritten, invalid data increases in a block. Even when the amount of invalid data increases in a block, as long as valid data remains therein, the data erase operation cannot be executed thereon. For example, when the number of erasable blocks decreases, the CPU 22 executes garbage collection.

Refresh is a process of rewriting data in a certain block into another block or the certain block when deterioration of the data in the certain block is detected. For example, the deterioration of data indicates a state in which the number of corrected bits in data error correction processing is increased.

The wear leveling is, for example, a process of leveling the number of times of data erase operation of each of a plurality of blocks of the nonvolatile memory 10 by exchanging data stored in a block having a relatively large number of times of data erase operation with data stored in a block having a relatively small number of times of data erase operation.

The ROM 23 is nonvolatile memory. For example, the ROM 23 is an electrically erasable programmable read-only memory (EEPROM™). The ROM 23 is a non-transitory storage medium that stores firmware, programs, and the like. For example, the CPU 22 loads the firmware from the ROM 23 into the RAM 24.

The RAM 24 is volatile memory. The RAM 24 is a dynamic random access memory (DRAM), a static random access memory (SRAM), or the like. The RAM 24 is used as a work area of the CPU 22. For example, the RAM 24 stores the firmware for managing the nonvolatile memory 10 and various management tables.

For example, the RAM 24 stores a user log, a lookup table (LUT), and a valid cluster pool as the management tables.

The user log is a log indicating a write status of user data into the nonvolatile memory 10. For example, the user log indicates, for each physical address, a relationship between a logical address and a physical address of the nonvolatile memory 10. The physical address is an address for specifying a memory element of the nonvolatile memory 10. Hereinafter, the physical address is also referred to as a NAND address. The logical address is an address used by the host device 2 to address the user data. Hereinafter, a case where a logical block address (LBA) is used as the logical address will be exemplified.

The lookup table is a table indicating a relationship between a logical block address and a corresponding NAND address for each logical block address. For example, the memory controller 20 manages mapping between logical block addresses and NAND addresses using the lookup table. For example, the CPU 22 loads a part of the lookup table from the nonvolatile memory 10 to the RAM 24. The lookup table in the RAM 24 is updated when a write operation is executed. Then, the CPU 22 updates the lookup table in the nonvolatile memory 10 at any timing based on the lookup table in the RAM 24.

The valid cluster pool is a table indicating a group of NAND addresses corresponding to valid clusters. For example, a page can be divided into a plurality of clusters. That is, the cluster is a data unit having a data length shorter than that of the page. Each cluster includes user data associated with a different logical block address. The valid cluster is a cluster including valid data. For example, at the time of garbage collection, a NAND address corresponding to a valid cluster in a read target block (i.e., copy source block) is stored in the valid cluster pool.

The buffer memory 25 is volatile memory. The buffer memory 25 is a DRAM, an SRAM, or the like. The buffer memory 25 temporarily stores user data read from the nonvolatile memory 10 by the memory controller 20, user data received from the host device 2, or the like.

The block management unit 26 manages the memory space of the nonvolatile memory 10 for each block. For example, the block management unit 26 manages the user log of each block. For example, when executing the garbage collection, the block management unit 26 reads the user log of the read target block from the nonvolatile memory 10. Then, the block management unit 26 stores the read user log in the RAM 24. In addition, for example, the block management unit 26 manages information of a write destination block (hereinafter, also referred to as "write destination information") of the garbage collection. For example, the write destination information includes information of the storage capacity of the write destination block (i.e., the amount of data that can be written to the write destination block).

The valid cluster search circuit 27 is a circuit that searches for a valid cluster from the information stored in the user log. For example, in the user log, a corresponding logical block address is stored for each cluster but the user data corresponding to the logical block address may be invalid data due to data rewriting or the like. The user log can be used to determine whether the corresponding cluster is a valid cluster or an invalid cluster. The valid cluster is a cluster including valid data. The invalid cluster is a cluster not including valid data. The valid cluster search circuit 27 compares the user log with the lookup table and extracts information of a valid cluster.

The scheduler 28 adjusts a schedule of various operations executed in the memory system 3. For example, the scheduler 28 performs scheduling of, for example, a write operation or a read operation based on a request from the host, a data erase operation, and garbage collection. The scheduler 28 selects the NAND controller 29 coupled to the memory chip 11 to be operated. Then, the scheduler 28 transmits an instruction (command) to the NAND controller 29 in the order based on the scheduling result. The command may include a NAND address or write data.

The NAND controller 29 controls the memory chip 11. One NAND controller 29 corresponds to one channel CH. In the example illustrated in FIG. 1, the memory controller 20 includes two NAND controllers 29_0 and 29_1. The NAND controller 29_0 corresponds to the channel CH0. The NAND controller 29_1 corresponds to the channel CH1. Hereinafter, in a case where the NAND controllers 290 and 29_1 are not distinguished from each other, it is simply referred to as the "NAND controller 29".

The NAND controller 29 transmits a command corresponding to a write operation, a read operation, a data erase operation, or the like to the memory chip 11. In addition, the NAND controller 29 receives read data from the memory chip 11 during the read operation.

1.1.3 Configuration of Memory Chip

Next, an example of a configuration of the memory chip 11 will be described with reference to FIG. 2. FIG. 2 is a block diagram illustrating a basic configuration of the memory chip 11. Note that, in the example illustrated in FIG. 2, a part of the coupling between constituent elements is indicated by arrow lines. However, the coupling between the constituent elements is not limited thereto.

As illustrated in FIG. 2, the memory chip 11 transmits and receives a signal DQ and timing signals DQS and DQSn to and from the memory controller 20 (in more detail, the NAND controller 29) via the NAND bus. The signal DQ is, for example, data DAT, an address ADD (NAND address ADD), or a command CMD. The timing signals DQS and DQSn are timing signals used at the time of input and output of the data DAT. The timing signal DQSn is an inverted signal of the timing signal DQS.

In addition, the memory chip 11 receives various control signals from the memory controller 20 via the NAND bus. In addition, the memory chip 11 transmits a ready/busy signal RBn to the memory controller 20 via the NAND bus. The ready/busy signal RBn is a signal indicating whether the memory chip 11 is in a state of being incapable of receiving the command CMD from the memory controller 20 (i.e., busy state) or in a state of being capable of receiving the command CMD (i.e., ready state).

Next, an internal configuration of the memory chip 11 will be described. The memory chip 11 includes an input/output circuit 101, a logic control circuit 102, an address register 103, a command register 104, a sequencer 105, a ready/busy circuit 106, and a plurality of planes PLN.

The input/output circuit 101 is a circuit that inputs and outputs the signal DQ. The input/output circuit 101 is coupled to the memory controller 20. In addition, the input/output circuit 101 is coupled to the logic control circuit 102, the address register 103, the command register 104, and a data register 114 of each plane PLN.

When the input signal DQ is the address ADD, the input/output circuit 101 transmits the address ADD to the address register 103. In addition, when the input signal DQ is the command CMD, the input/output circuit 101 transmits the command CMD to the command register 104.

When the input signal DQ is the data DAT, the input/output circuit 101 receives the input signal DQ based on the timing signals DQS and DQSn. Then, the input/output circuit 101 transmits the data DAT to the data register 114 of the corresponding plane PLN based on the address ADD stored in the address register 103. In addition, the input/output circuit 101 outputs the data DAT to the memory controller 20 together with the timing signals DQS and DQSn.

The logic control circuit 102 is a circuit that performs logic control based on the control signals. The logic control circuit 102 is coupled to the memory controller 20. In addition, the logic control circuit 102 is coupled to the input/output circuit 101 and the sequencer 105. The logic control circuit 102 receives the various control signals from the memory controller 20. The logic control circuit 102 controls the input/output circuit 101 and the sequencer 105 based on the received control signals.

The address register 103 is a register that temporarily stores the address ADD. The address register 103 is coupled to the input/output circuit 101 and a row decoder 112 and a column decoder 115 of each plane PLN. The address ADD includes a row address RA and a column address CA. The address register 103 transfers the row address RA to the row decoder 112. In addition, the address register 103 transfers the column address CA to the column decoder 115.

The command register 104 is a register that temporarily stores the command CMD. The command register 104 is coupled to the input/output circuit 101 and the sequencer 105. The command register 104 transfers the command CMD to the sequencer 105.

The sequencer 105 is a circuit that controls the memory chip 11. The sequencer 105 controls the entire operation of the memory chip 11. More specifically, for example, the sequencer 105 controls the ready/busy circuit 106, and, the row decoder 112, a sense amplifier 113, the data register 114, and the column decoder 115 of each plane PLN. The sequencer 105 executes a write operation, a read operation, a data erase operation, and the like based on the command CMD.

The ready/busy circuit 106 is a circuit that transmits the ready/busy signal RBn. The ready/busy circuit 106 transmits the ready/busy signal RBn to the memory controller 20 according to the operation status of the sequencer 105.

The plane PLN is a unit (memory area) that performs the write operation and the read operation of the data. In the example illustrated in FIG. 2, the memory chip 11 includes four planes PLN0, PLN1, PLN2, and PLN3. Note that the number of planes PLN included in the memory chip 11 is not limited to four. The planes PLN0 to PLN3 can operate independently of each other. In addition, the planes PLN0 to PLN3 can also operate in parallel. In other words, the memory chip 11 has a plurality of memory areas that can be controlled independently of each other. Hereinafter, in a case where the planes PLN0 to PLN3 are not distinguished from each other, it is simply referred to as the "plane PLN".

Next, an internal configuration of the plane PLN will be described. Hereinafter, a case where the planes PLN0 to PLN3 have the same configuration will be described. Note that the configuration of each plane PLN may be different. The plane PLN includes a memory cell array 111, the row decoder 112, the sense amplifier 113, the data register 114, and the column decoder 115.

The memory cell array 111 is a set of a plurality of memory cell transistors arranged in a matrix. The memory cell array 111 includes, for example, four blocks BLK0, BLK1, BLK2, and BLK3. Note that the number of blocks BLK in the memory cell array 111 is not limited. The block BLK is, for example, a set of a plurality of memory cell transistors from which data is collectively erased. That is, the block BLK is a unit of a data erase operation. Details of the configuration of the block BLK will be described below.

The row decoder 112 is a decode circuit of the row address RA. The row decoder 112 selects any block BLK in the memory cell array 111 based on the decoding result. The row decoder 112 applies voltages to interconnects in the row direction (i.e., a word line and a selection gate line to be described below) of the selected block BLK.

The sense amplifier 113 is a circuit that writes and reads the data DAT. The sense amplifier 113 is coupled to the memory cell array 111 and the data register 114. The sense amplifier 113 reads the data DAT from the memory cell array 111 during the read operation. In addition, the sense amplifier 113 supplies voltages corresponding to the write data DAT to the memory cell array 111 during the write operation.

The data register 114 is a register that temporarily stores the data DAT. The data register 114 is coupled to the sense amplifier 113 and the column decoder 115. The data register 114 includes a plurality of latch circuits. Each latch circuit temporarily stores write data or read data.

The column decoder 115 is a circuit that decodes the column address CA. The column decoder 115 receives the column address CA from the address register 103. The column decoder 115 selects the latch circuits in the data register 114 based on the decoding result of the column address CA.

1.1.4 Circuit Configuration of Memory Cell Array

Figure 3:
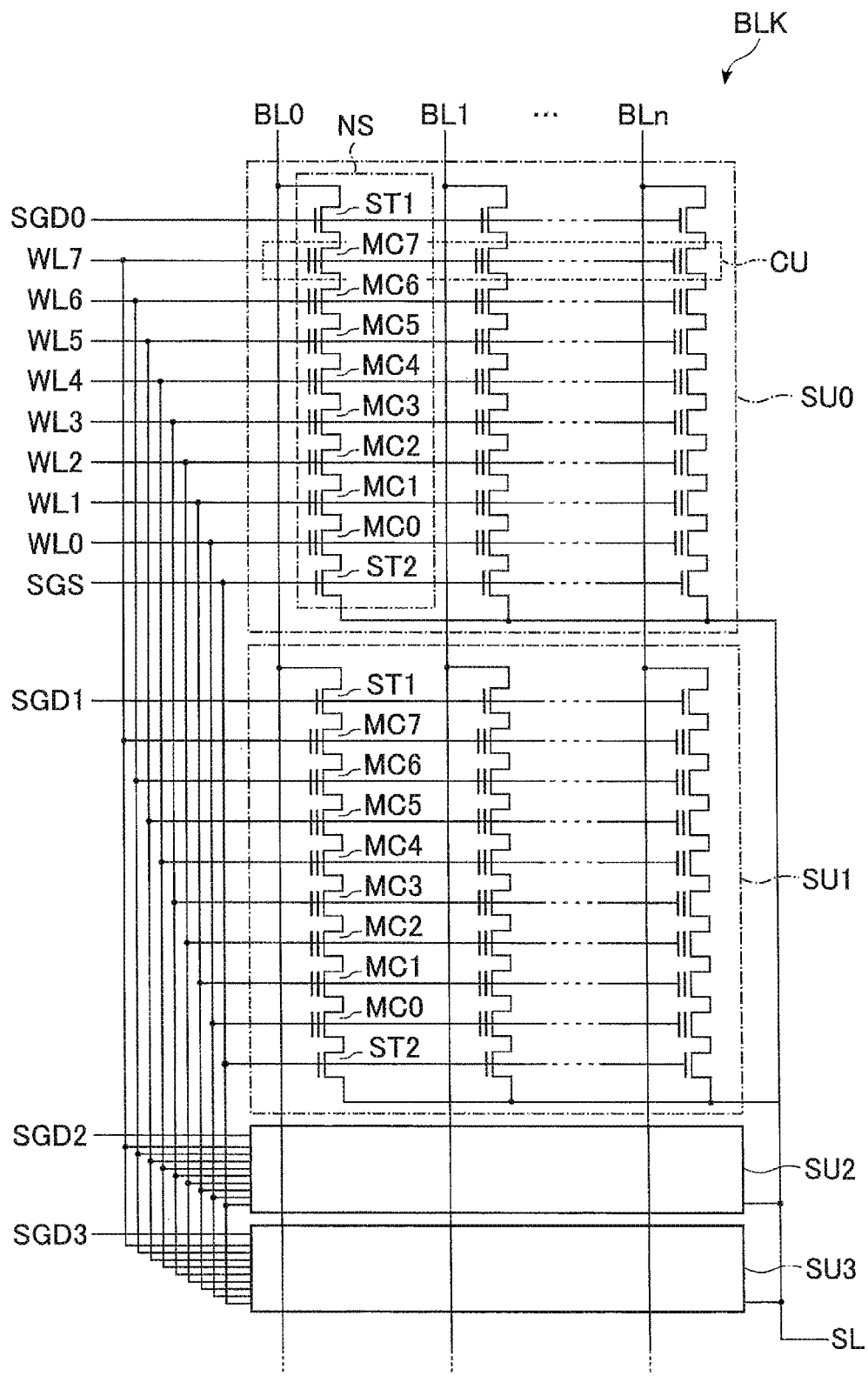
FIG. 3 is a circuit diagram illustrating an example of a circuit configuration of a memory cell array included in the memory system according to the first embodiment.

Next, an example of a circuit configuration of the memory cell array 111 will be described with reference to FIG. 3. FIG. 3 is a circuit diagram illustrating an example of a circuit configuration of the memory cell array 111.

The block BLK includes, for example, four string units SU0 to SU3. Note that the number of string units SU included in the block BLK is not limited. The string unit SU is, for example, a set of a plurality of NAND strings NS collectively selected in a write operation or a read operation.

Next, an internal configuration of the string unit SU will be described. The string unit SU includes a plurality of NAND strings NS. The NAND string NS is a set of a plurality of memory cell transistors coupled in series. Each of the plurality of NAND strings NS in the string unit SU is coupled to any of bit lines BL0 to BLn (n is an integer of 1 or more).

Next, an internal configuration of the NAND string NS will be described. Each NAND string NS includes a plurality of memory cell transistors MC and selection transistors ST1 and ST2. In the example illustrated in FIG. 3, the NAND string NS includes eight memory cell transistors MC0 to MC7.

The memory cell transistor MC is a memory element that stores data in a nonvolatile manner. The memory cell transistor MC includes a control gate and a charge storage layer. The memory cell transistor MC may be a metal-oxide-nitride-oxide-silicon (MONOS) type or a floating gate (FG) type.

The selection transistors ST1 and ST2 are switching elements. The selection transistors ST1 and ST2 are each used to select the string unit SU during various operations.

The current paths of the selection transistor ST2, the memory cell transistors MC0 to MC7, and the selection transistor ST1 in the NAND string NS are coupled in series. The drain of the selection transistor ST1 is coupled to the bit line BL. The source of the selection transistor ST2 is coupled to a source line SL.

The control gates of the memory cell transistors MC0 to MC7 of the same block BLK are commonly coupled word lines WL0 to WL7, respectively. More specifically, for example, the block BLK includes, for example, the four string units SU0 to SU3. Then, each string unit SU includes a plurality of memory cell transistors MC0. The control gates of the plurality of memory cell transistors MC0 in the block BLK are commonly coupled to the word line WL0. The same applies to the memory cell transistors MC1 to MC7.

The gates of the plurality of selection transistors ST1 in each string unit SU are commonly coupled to a selection gate line SGD. More specifically, the gates of the plurality of selection transistors ST1 in the string unit SU0 are commonly coupled to a selection gate line SGD0. The gates of the plurality of selection transistors ST1 in the string unit SU1 are commonly coupled to a selection gate line SGD1. The gates of the plurality of selection transistors ST1 in the string unit SU2 are commonly coupled to a selection gate line SGD2. The gates of the plurality of selection transistors ST1 in the string unit SU3 are commonly coupled to a selection gate line SGD3.

The gates of the plurality of selection transistors ST2 in the block BLK are commonly coupled to a selection gate line SGS.

The word lines WL0 to WL7, the selection gate lines SGD0 to SGD3, and the selection gate line SGS are coupled to the row decoder 112 in the plane PLN.

The bit line BL is commonly coupled to one of the plurality of NAND strings NS of each of the plurality of string units SU of each block BLK. Each bit line BL is coupled to the sense amplifier 113 in the plane PLN.

The source line SL is shared, for example, among the plurality of blocks BLK.

A set of the plurality of memory cell transistors MC coupled to the common word line WL in each string unit SU is referred to as, for example, a "cell unit CU". In other words, the cell unit CU is a set of a plurality of memory cell transistors MC collectively selected in the write operation or the read operation. The page is a unit of data that is collectively written (or collectively read) with respect to the cell unit CU. For example, when the memory cell transistor MC stores 1-bit data, the storage capacity of the cell unit CU is a page. Note that the cell unit CU can have a storage capacity of two or more pages based on the number of bits of data stored in the memory cell transistor MC.

Figures 4, 5:
FIG. 4 is a diagram illustrating an example of a configuration of a page in the memory cell array included in the memory system according to the first embodiment.
FIG. 5 is a diagram illustrating an example of a user log in the memory system according to the first embodiment.

A page PG includes a plurality of clusters CT. FIG. 4 illustrates an example of a configuration of a page PG. In the example illustrated in FIG. 4, a page PG includes four clusters CT.

For example, in the read operation of the memory chip 11, any of the cell units CU is selected, and data is read from the memory cell array 111 to the sense amplifier 113 in units of pages. The read data is stored in the data register 114. The data stored in the data register 114 can be transmitted to the memory controller 20 for each cluster CT. For example, the memory controller 20 requests the memory chip 11 to transmit the data of the valid cluster CT.

1.2 Specific Example of User Log

Next, a specific example of the user log will be described with reference to FIG. 5. FIG. 5 is a diagram illustrating an example of the user log.

As illustrated in FIG. 5, the user log includes information of a logical block address LBA corresponding to user data written in the cluster CT for each NAND address specifying the cluster CT. The user log may be managed in units of blocks. The example illustrated in FIG. 5 illustrates the user log of a block BLK100. Items of the block BLK, the page PG, and the cluster CT are illustrated as an example of the NAND address. Note that the NAND address may include information of the plane PLN, the string unit SU, or the word line WL. In the example illustrated in FIG. 5, a corresponding logical block address LBA is stored for each cluster CT.

More specifically, in user log #0, "0x1000" is stored as the logical block address LBA corresponding to a cluster CT0 of a page PG0. In user log #1, "0x1008" is stored as the logical block address LBA corresponding to a cluster CT1 of the page PG0. In user log #2, "0x1010" is stored as the logical block address LBA corresponding to a cluster CT2 of the page PG0. In user log #3, "0x1018" is stored as the logical block address LBA corresponding to a cluster CT3 of the page PG0. In user log #4, "0x1008" is stored as the logical block address LBA corresponding to a cluster CT0 of a page PG1. The user data corresponding to each logical block address LBA stored in the user log may be valid data or invalid data. For example, the same logical block address "0x1008" is stored in the user log #1 (the cluster CT1 of the page PG0) and the user log #4 (the cluster CT0 of the page PG1). In this case, valid data is stored in one of the clusters CT, and invalid data is stored in the other of the clusters CT. Note that the data amount of a cluster CT and the data amount of the user data corresponding to each logical block address LBA may be different. For example, user data corresponding to eight consecutive logical block addresses LBA may be stored in a cluster CT. In this case, for example, the head address of the eight logical block addresses LBA corresponding to a cluster CT may be stored as the information of the logical block address LBA.

1.3 Specific Example of Lookup Table

Next, a specific example of the lookup table will be described with reference to FIG. 6. FIG. 6 is a diagram illustrating an example of the lookup table.

As illustrated in FIG. 6, the lookup table includes information of a corresponding NAND address for each logical block address LBA. The example illustrated in FIG. 6 illustrates a case where user data respectively corresponding to eight logical block addresses LBA is stored in a cluster CT. In this case, for example, a corresponding NAND address is recorded in the lookup table for each head address of the eight logical block addresses LBA.

More specifically, the cluster CT0 of the page PG0 of the block BLK100 corresponds to the logical block address LBA "0x1000". The cluster CT0 of the page PG1 of the block BLK100 corresponds to the logical block address LBA "0x1008". The cluster CT2 of the page PG0 of the block BLK100 corresponds to the logical block address LBA "0x1010". The cluster CT3 of the page PG0 of the block BLK100 corresponds to the logical block address LEA "0x1018".

1.4 Specific Example of Valid Cluster Pool

Next, a specific example of the valid cluster pool will be described with reference to FIG. 7. FIG. 7 is a diagram illustrating an example of the valid cluster pool.

As illustrated in FIG. 7, the valid cluster pool is a group of information of NAND addresses corresponding to the valid cluster CT. In the example illustrated in FIG. 7, as the NAND address corresponding to the valid cluster CT, the cluster CT0 of the page PG0 of the block BLK100, the cluster CT0 of the page PG1 of the block BLK100, the cluster CT2 of the page PG0 of the block BLK100, and the cluster CT3 of the page PG0 of the block BLK100 are stored.

Next, a specific example of generation of the valid cluster pool will be described with reference to FIG. 8. FIG. 8 is a diagram illustrating a specific example of generation of the valid cluster pool.

As illustrated in FIG. 8, for example, the valid cluster search circuit 27 compares the user log with the lookup table. More specifically, the valid cluster search circuit 27 compares the NAND addresses corresponding to the same logical block address between the user log and the lookup table. When the NAND addresses coincide between the lookup table and the user log, the valid cluster search circuit 27 determines that the cluster CT of the user log includes valid data, that is, the cluster CT is a valid cluster CT. On the other hand, when the NAND addresses do not coincide, the valid cluster search circuit 27 determines that the cluster CT of the user log does not include valid data, that is, the cluster CT is an invalid cluster CT. The valid cluster search circuit 27 executes searching for a valid cluster for each cluster CT of the user log. As a result of the search, the NAND addresses of the valid clusters CT are stored in the RAM 24, and a valid cluster pool is generated.

In more detail, the valid cluster pool illustrated in FIG. 8 is an example of a valid cluster pool based on the example of the user log illustrated in FIG. 5 and the example of the lookup table illustrated in FIG. 6.

The LBA "0x1000" corresponding to the NAND address "BLK100, PG0, CT0" of the user log #0 is associated with the NAND address "BLK100, PG0, CT0" in the lookup table. That is, both NAND addresses coincide with each other. Therefore, the cluster CT corresponding to the user log #0 is a valid cluster CT.

The LBA "0x1008" corresponding to the NAND address "BLK100, PG0, CT1" of the user log #1 is associated with the NAND address "BLK100, PG1, CT0" in the lookup table. That is, both NAND addresses do not coincide with each other. Therefore, the cluster CT corresponding to the user log #1 is an invalid cluster CT.

The LBA "0x1010" corresponding to the NAND address "BLK100, PG0, CT2" of the user log #2 is associated with the NAND address "BLK100, PG0, CT2" in the lookup table. That is, both NAND addresses coincide with each other. Therefore, the cluster CT corresponding to the user log #2 is a valid cluster CT.

The LBA "0x1018" corresponding to the NAND address "BLK100, PG0, CT3" of the user log #3 is associated with the NAND address "BLK100, PG0, CT3" in the lookup table. That is, both NAND addresses coincide with each other. Therefore, the cluster CT corresponding to the user log #3 is a valid cluster CT.

The LBA "0x1008" corresponding to the NAND address "BLK100, PG1, CT0" of the user log #4 is associated with the NAND address "BLK100, PG1, CT0" in the lookup table. That is, both NAND addresses coincide with each other. Therefore, the cluster CT corresponding to the user log #4 is a valid cluster CT.

1.5 Read Operation in Garbage Collection

Next, a read operation in the garbage collection will be described. Hereinafter, a case where data of a valid cluster CT is read from a block BLK of each of the four planes PLN0 to PLN3 of the memory chip 11 will be described. The number of planes PLN from which the data of the valid cluster CT is read is not limited. In addition, the read target plane PLN may be distributed to a plurality of memory chips 11 coupled to a channel CH. Note that the read operation described below is not limited to the garbage collection, and can be applied to a case where data of a plurality of planes PLN is read in parallel via a channel CH (NAND bus).

The read operation roughly includes a cell read operation and a data output operation. The cell read operation is an operation of reading data from the memory cell array 111 to the data register 114. The cell read operation is executed in units of pages. The cell read operation is also referred to as a sense operation. The data output operation is an operation of outputting data from the data register 114 to the memory controller 20. The data output operation is executed in units of clusters. For example, within one-page data read by the cell read operation, data of the valid cluster is output to the memory controller 20 by the data output operation.

The cell read operation can be executed in parallel across a plurality of planes PLN. Since the channel CH (NAND bus) is common among the plurality of planes PLN, the data output operation cannot be executed in parallel across the plurality of planes PLN. For example, even when two planes PLN are ready for the data output operation, the data output operation of one plane PLN is completed first, and then the data output operation of the other plane PLN is executed. In such a case, the other plane PLN is in a standby state from the end of the cell read operation to the start of the data output operation.

In the present embodiment, the priority of the data output operation of each plane PLN is determined based on the situation of each plane PLN.

1.5.1 Specific Example of Priority Determination of Data Output Operation

First, a specific example of priority determination of the data output operation will be described with reference to FIG. 9. FIG. 9 is a diagram illustrating a specific example of determination of priority. The example illustrated in FIG. 9 illustrates a cluster map of each of the four planes PLN0 to PLN3. The cluster map indicates whether each cluster CT is a valid cluster or an invalid cluster. In addition, the example illustrated in FIG. 9 illustrates a case where a read target block BLK of each plane PLN includes eight pages PG, and a page PG includes four clusters CT.

As illustrated in FIG. 9, for example, in the case of garbage collection, the number of read target pages PG and the number of valid clusters CT are different for each plane PLN. That is, the valid cluster ratio of each block BLK is different. The valid cluster ratio is a ratio of the number of valid clusters to the total number of clusters CT of the block BLK. In other words, the number of times of cell read operation and the number of times of data output operation are different for each plane PLN.

In the example illustrated in FIG. 9, in the case of the plane PLN0, the page PG0 includes one valid cluster. The page PG1 includes two valid clusters. The page PG2 includes three valid clusters. The page PG3 includes two valid clusters. The page PG4 includes three valid clusters. The pages PG5 to PG7 do not include a valid cluster. The plane PLN0 includes a total of 11 valid clusters. In the plane PLN0, the cell read operation is executed 5 times and the data output operation is executed 11 times.

In the case of the plane PLN1, the page PG0 includes one valid cluster. The page PG1 does not include a valid cluster. The page PG2 includes three valid clusters. The page PG3 includes three valid clusters. The page PG4 includes three valid clusters. The page PG5 includes two valid clusters. The page PG6 includes one valid cluster. The page PG7 includes three valid clusters. The plane PLN1 includes a total of 16 valid clusters. In the plane PLN1, the cell read operation is executed 7 times and the data output operation is executed 16 times.

In the case of the plane PLN2, the page PG0 includes two valid clusters. The page PG1 includes two valid clusters. The page PG2 includes two valid clusters. The page PG3 includes one valid cluster. The page PG4 includes one valid cluster. The page PG5 includes two valid clusters. The pages PG6 and PG7 do not include a valid cluster. The plane PLN2 includes a total of 10 valid clusters. In the plane PLN2, the cell read operation is executed 6 times and the data output operation is executed 10 times.

In the case of the plane PLN3, the page PG0 includes one valid cluster. The page PG1 includes three valid clusters. The page PG2 includes two valid clusters. The page PG3 includes one valid cluster. The page PG4 includes one valid cluster. The pages PG5 to PG7 do not include a valid cluster. The plane PLN3 includes a total of 8 valid clusters. In the plane PLN3, the cell read operation is executed 5 times and the data output operation is executed 8 times.

A period of one cell read operation is tR. In addition, a period of one data output operation is tDout. For each plane PLN, the total time period (hereinafter, referred to as "tR+tDout total time") of the plurality of cell read operations and the plurality of data output operations is calculated. For example, in the present embodiment, the valid cluster search circuit 27 calculates the tR+tDout total time for each plane PLN based on the valid cluster search result. In other words, the valid cluster search circuit 27 calculates the tR+tDout total time for each plane PLN based on the valid cluster ratio of the plane PLN (target block BLK). Then, the valid cluster search circuit 27 determines the priority in descending order of the tR+tDout total time. In the example illustrated in FIG. 9, the length of the tR+tDout total time is assumed to be in the order of PLN1>PLN2>PLN0>PLN3. Based on this result, the valid cluster search circuit 27 sets the priority of each plane PLN as follows: the plane PLN1=the first place, PLN2=the second place, PLN0=the third place, and PLN3=the fourth place.

Next, a method of determining a plane PLN from a NAND address of the valid cluster pool will be described. For example, different block numbers (block addresses) are assigned to a plurality of blocks BLK included in a plurality of planes PLN coupled to a channel CH so that the blocks BLK can be identified from each other. More specifically, for example, the memory chip 11 illustrated in FIG. 2 includes the four planes PLN0 to PLN3. Then, each plane PLN includes the four blocks BLK. In such a case, for example, BLK0 to BLK3 are assigned as the block numbers of the four blocks BLK included in the plane PLN0. For example, BLK4 to BLK7 are assigned as the block numbers of the four blocks BLK included in the plane PLN1. For example, BLK8 to BLK11 are assigned as the block numbers of the four blocks BLK included in the plane PLN2. For example, BLK12 to BLK15 are assigned as the block numbers of the four blocks BLK included in the plane PLN3. The valid cluster search circuit 27 performs an arithmetic operation of "(block number)/4" from the block number of the valid cluster pool, and fixes the plane PLN from the integer part of the arithmetic operation result.

1.5.2 Timing Chart of Specific Example of Read Operation Based on Priority

Figure 10:
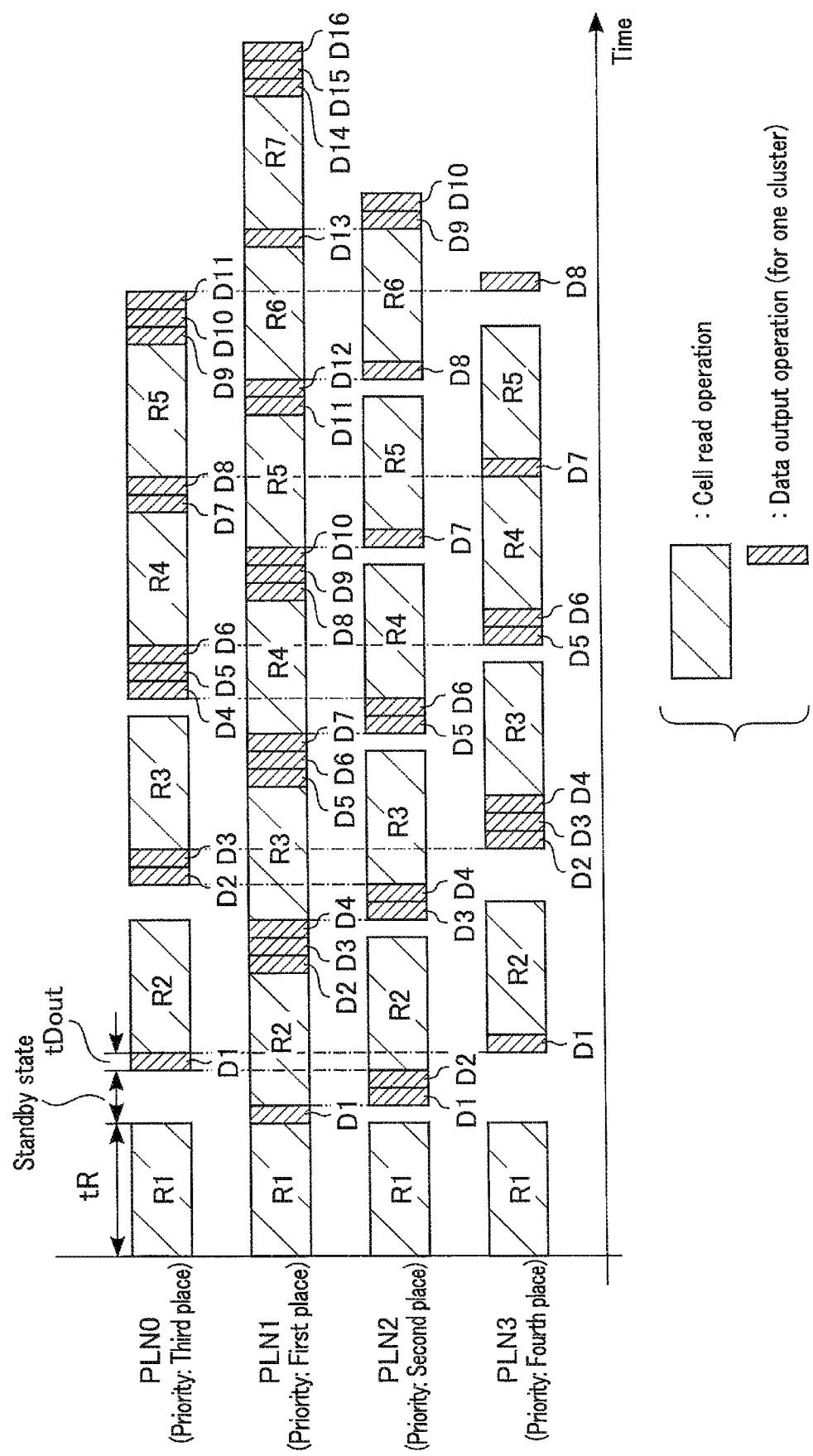
FIG. 10 is a timing chart illustrating a specific example of a read operation based on the priority in the memory system according to the first embodiment.

Next, a timing chart of a specific example of the read operation based on the priority will be described with reference to FIG. 10. FIG. 10 is a timing chart illustrating a specific example of the read operation based on the priority. Note that the example illustrated in FIG. 10 illustrates a case where the cell read operation and the data output operation are executed based on the cluster map and the priority described with reference to FIG. 9. In addition, to simplify the description, a period for transmitting a command from the memory controller 20 to the memory chip 11 is omitted. Furthermore, to simplify the description, a case where the periods tR of the cell read operations are the same is illustrated. Note that the period tR of the cell read operation may be different depending on the conditions of the read operation. For example, when the memory cell transistor MC stores 3-bit data including a lower bit, a middle bit, and an upper bit, the cell unit CU stores 3-page data including a lower page, a middle page, and an upper page. In such a case, the periods tR of the cell read operations of the pages are different from each other depending on the data allocation.

As illustrated in FIG. 10, the data output operation of the plane PLN1 with the highest priority is preferentially executed. As a result, a standby state hardly occurs in the plane PLN1. In this manner, by increasing the priority of the plane PLN having a long tR+tDout total time, an increase in the processing time period of the entire read operation is suppressed. Note that, in the example illustrated in FIG. 10, after the read operation of the plane PLN0 having the third-place priority is ended, the read operation of the plane PLN2 having the second-place priority is ended. In this manner, a situation in which the order of the end of the read operation and the priority do not coincide may occur. However, since the length of the processing time period of the entire read operation is defined by the read operation of the plane PLN1 having the lowest priority, there is little influence on the processing time period of the entire read operation.

Next, the timing of each read operation will be specifically described. Hereinafter, in a case where the cell read operation is executed in the plane PLN, it is referred to as the "the plane PLN executes the cell read operation". The same manner applies to the data output operation.

The plurality of planes PLN can execute the cell read operation in parallel. Thus, regardless of the priority, the planes PLN0 to PLN3 each execute a first cell read operation R1 for the page PG0 in parallel. The plane PLN1 (priority: first place) executes a data output operation D1 for a valid cluster CT included in the page PG0 after the first cell read operation R1 is completed. When the first cell read operation R1 is completed, the planes PLN0, PLN2, and PLN3 are in a standby state until the data output operation becomes executable. The plane PLN1 executes a second cell read operation R2 for the page PG2 after the data output operation D1 is completed. In addition, when the data output operation D1 of the plane PLN1 is completed, the plane PLN2 (priority: second place) continuously executes data output operations D1 and D2 for the two valid clusters CT included in the page PG0. The plane PLN2 executes a second cell read operation R2 for the page PG1 after the data output operation D2 is completed. In addition, when the data output operation D2 of the plane PLN2 is completed, the plane PLN0 (priority: third place) executes a data output operation D1 for a valid cluster CT included in the page PG0. The plane PLN0 executes a second cell read operation R2 for the page PG1 after the data output operation D1 is completed. In addition, when the data output operation D1 of the plane PLN0 is completed, the plane PLN3 (priority: fourth place) executes a data output operation D1 for a valid cluster CT included in the page PG0.

The plane PLN1 continuously executes data output operations D2, D3, and D4 for the three valid clusters CT included in the page PG2 after the second cell read operation R2 is completed. The plane PLN1 executes a third cell read operation R3 for the page PG3 after the data output operation D4 is completed. When each second cell read operation R2 is completed, the planes PLN0, PLN2, and PLN3 are in a standby state until the data output operation becomes executable. When the data output operation D4 of the plane PLN1 is completed, the plane PLN2 continuously executes data output operations D3 and D4 for the two valid clusters CT included in the page PG1. The plane PLN2 executes a third cell read operation R3 for the page PG2 after the data output operation D4 is completed. In addition, when the data output operation D4 of the plane PLN2 is completed, the plane PLN0 continuously executes data output operations D2 and D3 for the two valid clusters CT included in the page PG1. The plane PLN0 executes a third cell read operation R3 for the page PG2 after the data output operation D3 is completed. In addition, when the data output operation D3 of the plane PLN0 is completed, the plane PLN3 continuously executes data output operations D2, D3, and D4 for the three valid clusters CT included in the page PG1.

The plane PLN1 continuously executes data output operations D5, D6, and D7 for the three valid clusters CT included in the page PG3 after the third cell read operation R3 is completed. The plane PLN1 executes a fourth cell read operation R4 for the page PG4 after the data output operation D7 is completed. When the data output operation D7 of the plane PLN1 is completed, the plane PLN2 in the standby state continuously executes data output operations D5 and D6 for the two valid clusters CT included in the page PG2. The plane PLN2 executes a fourth cell read operation R4 for the page PG3 after the data output operation D6 is completed. When the data output operation D6 of the plane PLN2 is completed, the plane PLN0 in the standby state continuously executes data output operations D4, D5, and D6 for the three valid clusters CT included in the page PG2. The plane PLN0 executes a fourth cell read operation R4 for the page PG3 after the data output operation D6 is completed. When the data output operation D6 of the plane PLN0 is completed, the plane PLN3 in the standby state continuously executes data output operations D5 and D6 for the two valid clusters CT included in the page PG2. The plane PLN3 executes a fourth cell read operation R4 for the page PG3 after the data output operation D6 is completed.

The plane PLN1 continuously executes data output operations D8, D9, and D10 for the three valid clusters CT included in the page PG4 after the fourth cell read operation R4 is completed. The plane PLN1 executes a fifth cell read operation R5 for the page PG5 after the data output operation D10 is completed. When the data output operation D10 of the plane PLN1 is completed, the plane PLN2 in the standby state executes data output operation D7 for the valid cluster CT included in the page PG3. The plane PLN2 executes a fifth cell read operation R5 for the page PG4 after the data output operation D7 is completed. Thereafter, the plane PLN0 continuously executes data output operations D7 and D8 for the two valid clusters CT included in the page PG3 after the fourth cell read operation R4 is completed. The plane PLN0 executes a fifth cell read operation R5 for the page PG4 after the data output operation D8 is completed. When the data output operation D8 of the plane PLN0 is completed, the plane PLN3 executes a data output operation D7 for the valid cluster CT included in the page PG3. The plane PLN3 executes a fifth cell read operation R5 for the page PG4 after the data output operation D7 is completed.

The plane PLN1 continuously executes data output operations D11 and D12 for the two valid clusters CT included in the page PG5 after the fifth cell read operation R5 is completed. The plane PLN1 executes a sixth cell read operation R6 for the page PG6 after the data output operation D12 is completed. When the data output operation D12 of the plane PLN1 is completed, the plane PLN2 in the standby state executes a data output operation D8 for the valid cluster CT included in the page PG4. The plane PLN2 executes a sixth cell read operation R6 for the page PG5 after the data output operation D8 is completed. Thereafter, the plane PLN0 continuously executes data output operations D9, D10, and D11 for the three valid clusters CT included in the page PG4 after the fifth cell read operation R5 is completed. When the data output operation D11 is completed, the plane PLN0 completes the read operation. When the data output operation D11 of the plane PLN0 is completed, the plane PLN3 in the standby state executes a data output operation D8 for the valid cluster CT included in the page PG4. When the data output operation D8 is completed, the plane PLN3 completes the read operation.

The plane PLN1 executes a data output operation D13 for the valid cluster CT included in the page PG6 after the sixth cell read operation R6 is completed. The plane PLN1 executes a seventh cell read operation R7 for the page PG7 after the data output operation D13 is completed. The plane PLN2 executes data output operations D9 and D10 for the two valid clusters CT included in the page PG5 after the sixth cell read operation R6 is completed. For example, the data output operations of the two valid clusters CT are continuously executed. When the data output operation D10 is completed, the plane PLN2 completes the read operation.

The plane PLN1 executes data output operations D14, D15, and D16 for the three valid clusters CT included in the page PG7 after the seventh cell read operation R7 is completed. For example, the data output operations for the three valid clusters CT are continuously executed. When the data output operation D16 is completed, the plane PLN1 completes the read operation.

1.5.3 Flow of Read Operation of Garbage Collection

Figure 11:
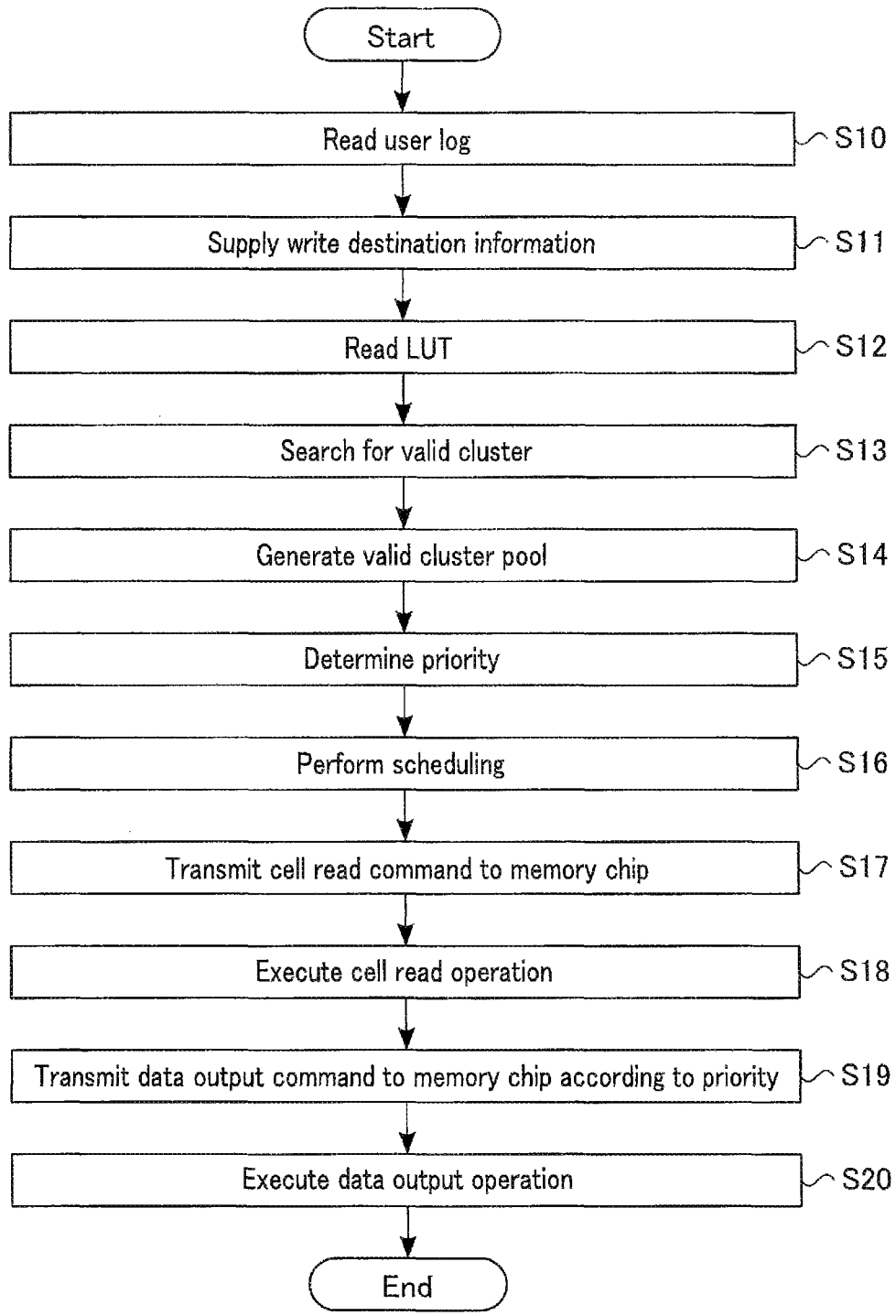
FIG. 11 is a flowchart illustrating an example of a read operation of garbage collection in the memory system according to the first embodiment.

Next, an example of a flow of the read operation of garbage collection will be described with reference to FIG. 11. FIG. 11 is a flowchart illustrating an example of the read operation of garbage collection.

As illustrated in FIG. 11, first, the block management unit 26 reads the user log of a read target block BLK from the target memory chip 11 (S10). The block management unit 26 transmits the user log to the valid cluster search circuit 27.

The block management unit 26 transmits write destination information of a write destination block BLK to which valid clusters CT are to be written to the valid cluster search circuit 27 (S11). Note that steps S10 and S11 may be interchanged in order or may be executed in parallel.

The valid cluster search circuit 27 reads the lookup table from the RAM 24 (S12).

The valid cluster search circuit 27 compares the user log with the lookup table and searches for a valid cluster (S13). The valid cluster search circuit 27 determines whether each cluster CT of the user log is invalid or valid.

The search result is transmitted to the RAM 24, and the valid cluster pool is generated (S14).

The valid cluster search circuit 27 determines the priority of the data output operation of the plurality of read target planes PLN (block BLK) based on the search result (S15). The valid cluster search circuit 27 determines the priority of each plane PLN in a set of a plurality of planes PLN that executes the write operations collectively (for example, in parallel). More specifically, the valid cluster search circuit 27 calculates the tR+tDout total time for each plane PLN. Then, the valid cluster search circuit 27 determines the priority based on the calculation result. The valid cluster search circuit 27 transmits the determined priority to the scheduler 28.

The scheduler 28 schedules the read operations in each plane PLN based on the valid cluster pool and the result of the priority (S16). More specifically, the scheduler 28 receives instructions of various operations such as a write operation, a read operation, an erase operation, and garbage collection from the CPU 22. The scheduler 28 adjusts the schedule of these operations and determines the timing of executing the garbage collection. Then, when executing the garbage collection, the scheduler 28 determines the schedule of the cell read operation and the data output operation of each plane PLN based on the valid cluster pool and the priority.

The NAND controller 29 transmits a command for requesting the cell read operation to the target memory chip 11 based on an instruction of the scheduler (S17).

When receiving the command, the sequencer 105 executes the cell read operation (S18).

The NAND controller 29 transmits a command requesting the data output operation to the target memory chip 11 according to the priority (S19).

When receiving the command, the sequencer 105 executes the data output operation (S20). When the data output operation of all the valid clusters CT is ended, the read operation is completed.

1.6 Advantage of Present Embodiment

With the configuration according to the present embodiment, it is possible to provide a memory system with improved processing capability. This advantage will be described in detail.

For example, in the garbage collection executed in a comparative example, when data is read from a plurality of planes PLN via a NAND bus, the data output operation is executed in a round-robin manner. That is, the plane PLN that is ready for outputting the data sequentially outputs the data of the valid cluster CT one by one. For example, in the garbage collection, the number of read target valid clusters CT is different for each plane PLN. In addition, the total time period of the cell read operation and the data output operation is also different. Thus, in a case where the round-robin manner is applied, even in the plane PLN having the longest total time period, a standby state occurs similarly to the other planes PLN. Thus, the processing time period of the entire read operation is increased.

On the other hand, with the configuration according to the present embodiment, the memory controller 20 calculates the tR+tDout total time for each plane PLN. The memory controller 20 can determine the priority of the data output operation of each plane PLN in descending order of the tR+tDout total time. Then, the memory controller 20 can request the data output operation based on the priority. By preferentially executing the data output operation of the plane PLN having a long tR+tDout total time, the memory controller 20 can suppress the occurrence of the standby state in the plane PLN and suppress the increase in the processing time period of the entire read operation of the valid clusters CT. Therefore, the processing capability of the memory system 3 can be improved.

2. Second Embodiment

Next, a second embodiment will be described. In the second embodiment, a priority determination method different from that of the first embodiment will be described. Hereinafter, differences from the first embodiment will be mainly described.

2.1 Specific Example of Priority Determination of Data Output Operation

First, a specific example of the priority determination of the data output operation will be described with reference to FIG. 12. FIG. 12 is a diagram illustrating a specific example of determination of priority. The example illustrated in FIG. 12 illustrates a cluster map of four planes PLN0 to PLN3. In addition, the example illustrated in FIG. 12 illustrates a case where a block BLK of each plane PLN includes eight pages PG, and a page PG includes four clusters CT.

In the example illustrated in FIG. 12, similarly to the diagram illustrated in FIG. 9, the length of tR+tDout total time is assumed to be in the order of PLN1>PLN2>PLN0>PLN3. As illustrated in FIG. 12, in the present embodiment, the valid cluster search circuit 27 sets the priority of the plane PLN1 having the longest tR+tDout total time to the first place and the priorities of the other planes PLN0, PLN2, and PLN3 to the second place. That is, the valid cluster search circuit 27 preferentially executes the data output operation of the plane PLN having the longest tR+tDout total time. Note that, in the example illustrated in FIG. 12, the valid cluster search circuit 27 calculates all the tR+tDout total time of the planes PLN0 to PLN3 and compares the lengths of the tR+tDout total time of the planes PLN, but is not limited thereto. As long as the plane PLN having the longest tR+tDout total time can be determined, the calculation of the tR+tDout total time may be omitted for other planes PLN (for example, the planes PLN0 and PLN3) having a relatively small number of valid clusters CT.

2.2 Timing Chart of Specific Example of Read Operation Based on Priority

Figure 13:
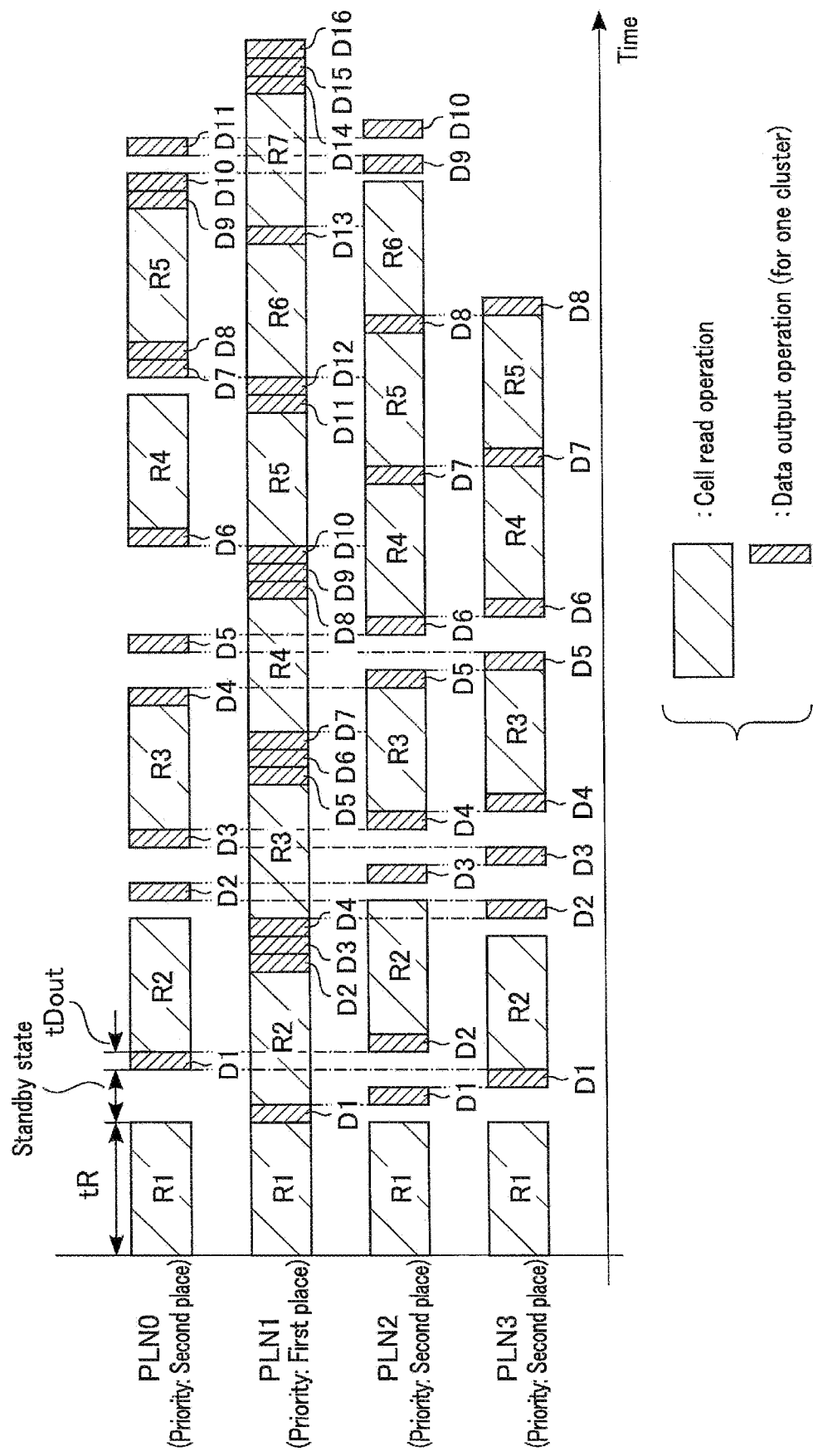
FIG. 13 is a timing chart illustrating a specific example of a read operation based on the priority in the memory system according to the second embodiment.

Next, a timing chart of a specific example of the read operation based on the priority will be described with reference to FIG. 13. FIG. 13 is a timing chart illustrating a specific example of the read operation based on priority. Note that the example illustrated in FIG. 13 illustrates a case where the cell read operation and the data output operation are executed based on the cluster map and the priority described with reference to FIG. 12. In addition, to simplify the description, a period for transmitting a command from the memory controller 20 to the memory chip 11 is omitted. Furthermore, to simplify the description, a case where periods tR of the cell read operations are the same is illustrated.

As illustrated in FIG. 13, in the present embodiment, the data output operation of the plane PLN1 having the first-place priority is preferentially executed. Then, the data output operation of the planes PLN0, PLN2, and PLN3 having the second-place priority is executed in a round-robin manner.

Hereinafter, the timing of each read operation will be specifically described. First, regardless of the priority, the planes PLN0 to PLN3 each execute a first cell read operation R1 for the page PG0 in parallel. The plane PLN1 (priority: first place) executes a data output operation D1 for the valid cluster CT included in the page PG0 after the first cell read operation R1 is completed. When the first cell read operation R1 is completed, the planes PLN0, PLN2, and PLN3 are in a standby state until the data output operation becomes executable. The plane PLN1 executes a second cell read operation R2 for the page PG2 after the data output operation D1 is completed. When the data output operation D1 of the plane PLN1 is completed, the planes PLN0, PLN2, and PLN3 in the standby state execute the data output operation based on the round-robin manner. First, the plane PLN2 executes a data output operation D1 for the first valid cluster CT of the two valid clusters CT included in the page PG0. When the data output operation D1 of the plane PLN2 is completed, the plane PLN3 executes a data output operation D1 for the valid cluster CT included in the page PG0. The plane PLN3 executes a second cell read operation R2 for the page PG1 after the data output operation D1 is completed. In addition, when the data output operation D1 of the plane PLN3 is completed, the plane PLN0 executes a data output operation D1 for the valid cluster CT included in the page PG0. The plane PLN0 executes a second cell read operation R2 for the page PG1 after the data output operation D1 is completed. In addition, when the data output operation D1 of the plane PLN0 is completed, the plane PLN2 executes a data output operation D2 for the second valid cluster CT of the two valid clusters CT included in the page PG0. The plane PLN2 executes a second cell read operation R2 for the page PG1 after the data output operation D2 is completed.

The plane PLN1 continuously executes data output operations D2, D3, and D4 for the three valid clusters CT included in the page PG2 after the second cell read operation R2 is completed. The plane PLN1 executes a third cell read operation R3 for the page PG3 after the data output operation D4 is completed. After the data output operation D4 of the plane PLN1 is completed, the data output operation of the planes PLN0, PLN2, and PLN3 is executed in a round-robin manner. First, the plane PLN3 in the standby state executes a data output operation D2 for the first valid cluster CT of the three valid clusters CT included in the page PG1. When the data output operation D2 of the plane PLN3 is completed, the plane PLN0 executes a data output operation D2 for the first valid cluster CT of the two valid clusters CT included in the page PG1. When the data output operation D2 of the plane PLN0 is completed, the plane PLN2 executes a data output operation D3 for the first valid cluster CT of the two valid clusters CT included in the page PG1. When the data output operation D3 of the plane PLN2 is completed, the plane PLN3 executes a data output operation D3 for the second valid cluster CT of the three valid clusters CT included in the page PG1. When the data output operation D3 of the plane PLN3 is completed, the plane PLN0 executes a data output operation D3 for the second valid cluster CT of the two valid clusters CT included in the page PG1. The plane PLN0 executes a third cell read operation R3 for the page PG2 after the data output operation D3 is completed. In addition, when the data output operation D3 of the plane PLN0 is completed, the plane PLN2 executes a data output operation D4 for the second valid cluster CT of the two valid clusters CT included in the page PG1. The plane PLN2 executes a third cell read operation R3 for the page PG2 after the data output operation D4 is completed. In addition, when the data output operation D4 of the plane PLN2 is completed, the plane PLN3 executes a data output operation D4 for the third valid cluster CT of the three valid clusters CT included in the page PG1. The plane PLN3 executes a third cell read operation R3 for the page PG2 after the data output operation D4 is completed.

The plane PLN1 continuously executes data output operations D5, D6, and D7 for the three valid clusters CT included in the page PG3 after the third cell read operation R3 is completed. The plane PLN1 executes a fourth cell read operation R4 for the page PG4 after the data output operation D7 is completed. For example, while the plane PLN1 is executing the cell read operation R4, the cell read operation R3 of the plane PLN0 is completed. Then, the plane PLN0 executes a data output operation D4 for the first valid cluster CT of the three valid clusters CT included in the page PG2. When the data output operation D4 of the plane PLN0 is completed, the plane PLN2 executes a data output operation D5 for the first valid cluster CT of the two valid clusters CT included in the page PG2. When the data output operation D5 of the plane PLN2 is completed, the plane PLN3 executes a data output operation D5 for the first valid cluster CT of the two valid clusters CT included in the page PG2. When the data output operation D5 of the plane PLN3 is completed, the plane PLN0 executes a data output operation D5 for the second valid cluster CT of the three valid clusters CT included in the page PG2. When the data output operation D5 of the plane PLN0 is completed, the plane PLN2 executes a data output operation D6 for the second valid cluster CT of the two valid clusters CT included in the page PG2. The plane PLN2 executes a fourth cell read operation R4 for the page PG3 after the data output operation D6 is completed. In addition, when the data output operation D6 of the plane PLN2 is completed, the plane PLN3 executes a data output operation D6 for the second valid cluster CT of the two valid clusters CT included in the page PG2. The plane PLN3 executes a fourth cell read operation R4 for the page PG3 after the data output operation D6 is completed. For example, the fourth cell read operation R4 of the plane PLN1 is completed before the plane PLN3 completes the data output operation D6. Then, even when the plane PLN0 is in the standby state, the data output operation of the plane PLN1 is preferentially executed.

The plane PLN1 continuously executes data output operations D8, D9, and D10 for the three valid clusters CT included in the page PG4 after the fourth cell read operation R4 is completed. The plane PLN1 executes a fifth cell read operation R5 for the page PG5 after the data output operation D10 is completed. When the data output operation D10 of the plane PLN1 is completed, the plane PLN0 executes a data output operation D6 for the third valid cluster CT of the three valid clusters CT included in the page PG2. The plane PLN0 executes a fourth cell read operation R4 for the page PG3 after the data output operation D6 is completed. Thereafter, the plane PLN2 executes a data output operation D7 for the valid cluster CT included in the page PG3 after the fourth cell read operation R4 is completed. The plane PLN2 executes a fifth cell read operation R5 for the page PG4 after the data output operation D7 is completed. In addition, when the data output operation D7 of the plane PLN2 is completed, the plane PLN3 executes a data output operation D7 for the valid cluster CT included in the page PG3. The plane PLN3 executes a fifth cell read operation R5 for the page PG4 after the data output operation D7 is completed.

The plane PLN1 continuously executes data output operations D11 and D12 for the two valid clusters CT included in the page PG5 after the fifth cell read operation R5 is completed. The plane PLN1 executes a sixth cell read operation R6 for the page PG6 after the data output operation D12 is completed. For example, when the data output operation D12 of the plane PLN1 is completed, the plane PLN0 in the standby state executes a data output operation D7 for the first valid cluster CT of the two valid clusters CT included in the page PG3. Since the planes PLN2 and PLN3 are each executing the cell read operation R5 when the data output operation D7 is completed, the plane PLN0 continuously executes a data output operation D8 for the second valid cluster CT of the two valid clusters CT included in the page PG3. The plane PLN0 executes a fifth cell read operation R5 for the page PG4 after the data output operation D8 is completed. In addition, after the data output operation D8 of the plane PLN0 is completed, the plane PLN2 executes a data output operation D8 for the valid cluster CT included in the page PG4. The plane PLN2 executes a sixth cell read operation R6 for the page PG5 after the data output operation D8 is completed. In addition, when the data output operation D8 of the plane PLN2 is completed, the plane PLN3 executes a data output operation D8 for the valid cluster CT included in the page PG4. When the data output operation D8 is completed, the plane PLN3 completes the read operation.

The plane PLN1 executes a data output operation D13 for the valid cluster CT included in the page PG6 after the sixth cell read operation R6 is completed. The plane PLN1 executes a seventh cell read operation R7 for the page PG7 after the data output operation D13 is completed. Thereafter, for example, when the fifth cell read operation R5 of the plane PLN0 is completed, the plane PLN0 executes a data output operation D9 for the first valid cluster CT of the three valid clusters CT included in the page PG4. Since the plane PLN2 is executing the cell read operation R6 when the data output operation D9 of the plane PLN0 is completed, the plane PLN0 continuously executes a data output operation D10 for the second valid cluster CT of the three valid clusters CT included in the page PG4. When the data output operation D10 of the plane PLN0 is completed, the plane PLN2 in the standby state executes a data output operation D9 for the first valid cluster CT of the two valid clusters CT included in the page PG5. When the data output operation D9 of the plane PLN2 is completed, the plane PLN0 executes a data output operation D11 for the third valid cluster CT of the three valid clusters CT included in the page PG4. When the data output operation D11 is completed, the plane PLN0 completes the read operation. When the data output operation D11 of the plane PLN0 is completed, the plane PLN2 executes a data output operation D10 for the second valid cluster CT of the two valid clusters CT included in the page PG5. When the data output operation D10 is completed, the plane PLN2 completes the read operation.

The plane PLN1 executes data output operations D14, D15, and D16 for the three valid clusters CT included in the page PG7 after the seventh cell read operation R7 is completed. When the data output operation D16 is completed, the plane PLN1 completes the read operation.

2.3 Advantages to Present Embodiment

With the configuration according to the present embodiment, the same advantages as those of the first embodiment can be obtained.

In addition, with the configuration according to the present embodiment, it is sufficient that one plane PLN having the highest priority can be selected. Thus, for example, the calculation of the tR+tDout total time can be omitted for other planes PLN in which the number of valid clusters CT is relatively small. That is, the determination of the priority can be simplified.

3. Third Embodiment

Next, a third embodiment will be described. In the third embodiment, a case where a NAND controller 29a executes determination of priority and scheduling will be described. Hereinafter, differences from the first and second embodiments will be mainly described.

3.1 Configuration of Memory System

Figure 14:
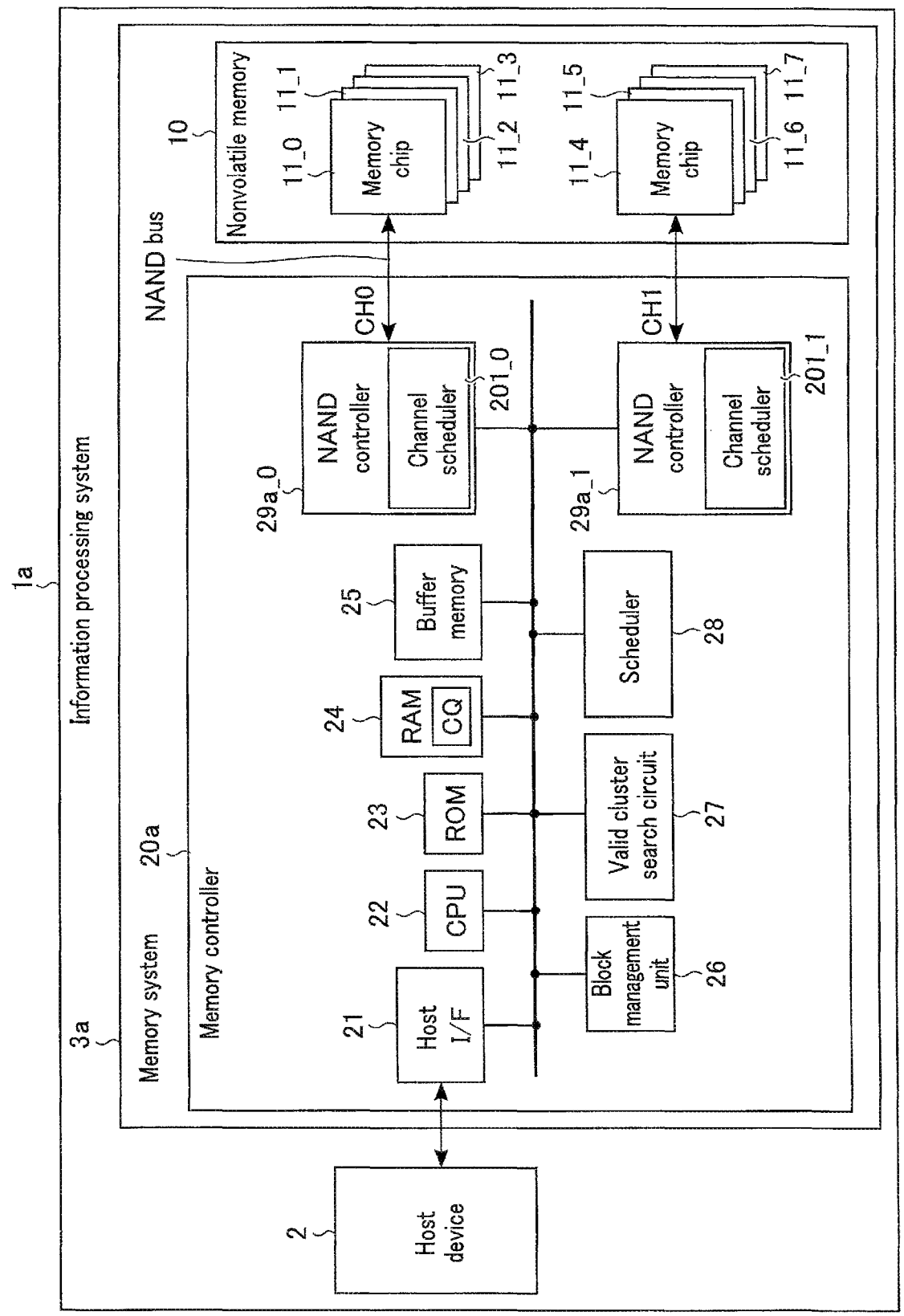
FIG. 14 is a block diagram illustrating an example of an overall configuration of an information processing system including a memory system according to a third embodiment.

First, an example of a configuration of a memory system 3a will be described with reference to FIG. 14. FIG. 14 is a block diagram illustrating an example of an overall configuration of an information processing system 1a.

As illustrated in FIG. 14, the overall configuration of the information processing system 1a of the present embodiment is the same as the overall configuration of the information processing system 1 of the first embodiment described with reference to FIG. 1. The present embodiment is different from the first embodiment in the internal configuration of a memory controller 20a. Hereinafter, a configuration different from that of the first embodiment will be described.

The RAM 24 includes one or more command queues CQ. The one or more command queues CQ correspond to the one or more NAND controllers 29a, respectively. The command queue CQ is a queue used when the CPU 22 instructs the memory chip 11 to perform various operations. The command queue CQ stores commands to be transmitted to the corresponding NAND controller 29a. For example, the command queue CQ has a plurality of entries corresponding to a plurality of commands. Note that the command queue CQ may be provided in the NAND controller 29a.

The scheduler 28 stores a plurality of instructions (commands) such as a write operation, a read operation, and a data erase operation received from the CPU 22 in the command queue CQ corresponding to the target NAND controller 29a.

The NAND controller 29a includes a channel scheduler 201. The channel scheduler 201 is a circuit that adjusts the schedule of an operation executed by the memory chip 11 coupled to a corresponding channel CH. In the example illustrated in FIG. 14, a NAND controller 29a_0 includes a channel scheduler 201_0. A NAND controller 29a_1 includes a channel scheduler 201_1. Hereinafter, in a case where the channel schedulers 201_0 and 201_1 are not distinguished from each other, it is simply referred to as the "channel scheduler 201". For example, the channel scheduler 201 schedules a command to be executed by the corresponding memory chip 11 based on the command received from the command queue CQ. The NAND controller 29 transmits a command to the memory chip 11 based on the adjustment of the channel scheduler 201.

The NAND controller 29a controls the timing of a command to be transmitted from the command queue CQ to the channel scheduler 201 so that a plurality of commands do not conflict. Hereinafter, this control of the timing is also referred to as "exclusive control". More specifically, for example, in a case where a read operation command and a write operation command to be executed in one plane PLN are stored in the command queue CQ, since the read operation and the write operation cannot be executed simultaneously, it can be said that two commands are in a state of conflict. Thus, for example, the NAND controller 29a first transmits the read operation command to the channel scheduler 201. Then, after the read operation in the memory chip 11 is completed, the NAND controller 29a transmits the write operation command from the command queue CQ to the channel scheduler 201.

In the present embodiment, the NAND controller 29a determines the priority of the data output operation.

3.2 Specific Example of Command Queue

Next, a specific example of the command queue CQ will be described with reference to FIG. 15. FIG. 15 is a diagram illustrating a specific example of the command queue CQ.

As illustrated in FIG. 15, the command queue CQ stores a plurality of instructions (commands) and corresponding NAND addresses. For example, a plurality of commands is given identification numbers ((A) to (J) in the example illustrated in FIG. 15) in the order of input to the command queue CQ so as to be distinguished from each other even for the same instruction. In the example illustrated in FIG. 15, identifiers of the memory chips 11, the plane PLN, and the page PG are illustrated as items of the NAND address. Note that information such as block BLK or cluster CT may be stored as the information of the NAND address.

More specifically, for example, the command "Read(A)" is a read instruction for the page PG0 of the plane PLN0 of the memory chip 11_0. The command "Read(B)" is a read instruction for the page PG1 of the plane PLN1 of the memory chip 11_1. The command "Read(C)" is a read instruction for the page PG0 of the plane PLN0 of the memory chip 11_1. The command "Read(D)" is a read instruction for the page PG0 of the plane PLN0 of the memory chip 11_0. The command "Write(E)" is a write instruction for the page PG0 of the plane PLN0 of the memory chip 11_1. The command "Read(F)" is a read instruction for the page PG0 of the plane PLN1 of the memory chip 11_1. The command "Read(G)" is a read instruction for the page PG0 of the plane PLN0 of the memory chip 11_1. The command "Read(H)" is a read instruction for the page PG1 of the plane PLN0 of the memory chip 11_0. The command "Read(I)" is a read instruction for the page PG0 of the plane PLN0 of the memory chip 11_1. The command "Read(J)" is a read instruction for the page PG0 of the plane PLN1 of the memory chip 11_0.

3.3 Specific Example of Determination of Priority and Scheduling

Figure 16:
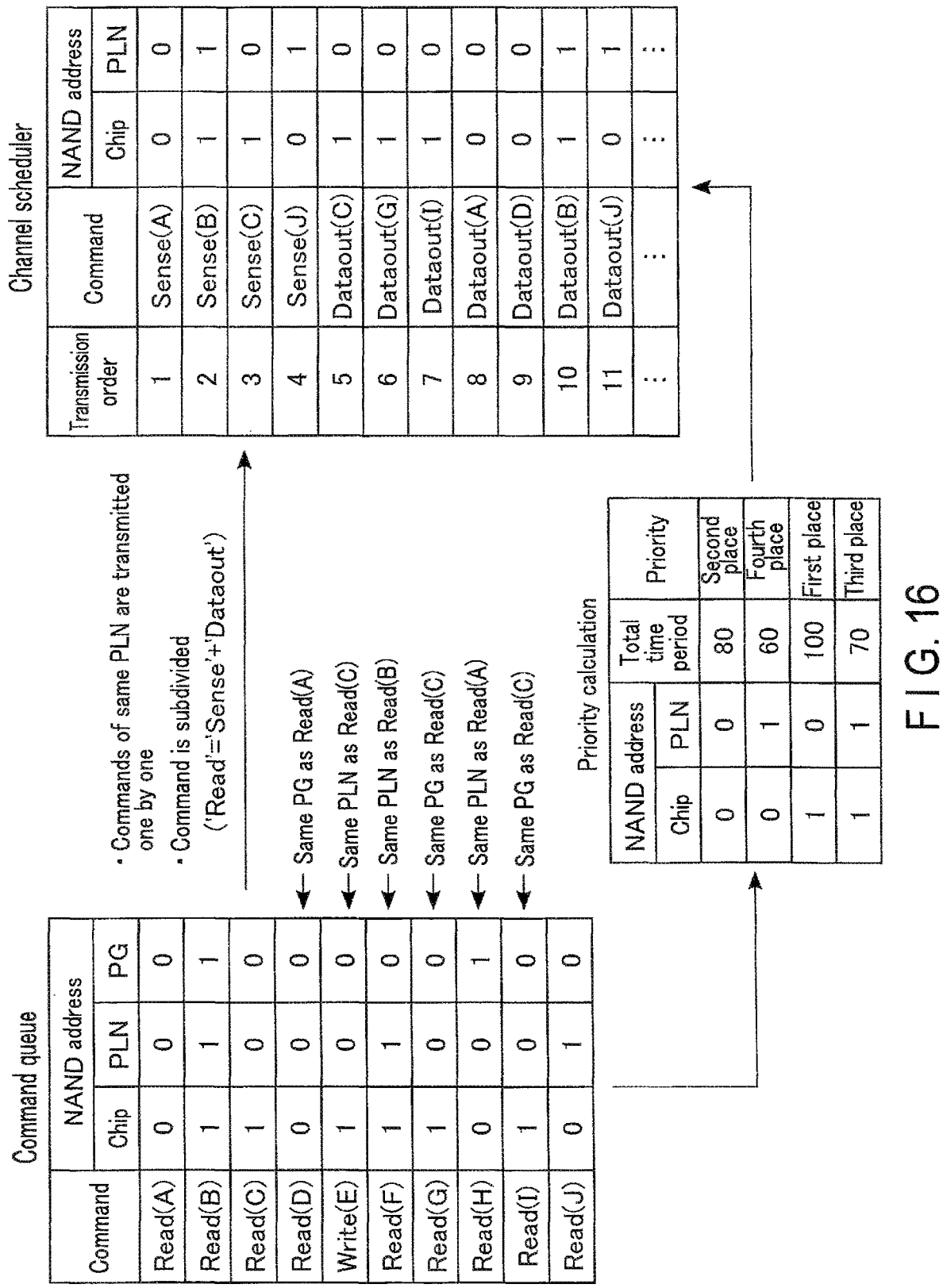
FIG. 16 is a diagram illustrating a specific example of determination of the priority and scheduling in a NAND controller included in the memory system according to the third embodiment.

Next, a specific example of determination of the priority and scheduling will be described with reference to FIG. 16. FIG. 16 is a diagram illustrating a specific example of determination of the priority and scheduling in the NAND controller 29a.

In the first embodiment, the case where the valid cluster search circuit 27 determines the priority has been described. In the first embodiment, the scheduler 28 performs entire scheduling of the nonvolatile memory 10 based on the priority. On the other hand, in the present embodiment, the NAND controller 29a determines the priority based on the command queue CQ. Then, the channel scheduler 201 adjusts the schedule of the command to be transmitted to the memory chip 11 based on the priority.

As illustrated in FIG. 16, the NAND controller 29a calculates the tR+tDout total time for each plane PLN, for example, based on the commands in the command queue CQ illustrated in FIG. 15. Then, the NAND controller 29a determines the priority based on the calculation result. In the example illustrated in FIG. 16, the planes PLN0 and PLN1 of the memory chip 11_0 and the planes PLN0 and PLN1 of the memory chip 11_1 are selected as the read target of the garbage collection. The NAND controller 29a refers to the command queue CQ and calculates the tR+tDout total time of each plane PLN. Here, it is assumed that the tR+tDout total time of the plane PLN0 of the memory chip 11_0 is calculated to be 80, the tR+tDout total time of the plane PLN1 of the memory chip 11_0 is calculated to be 60, the tR+tDout total time of the plane PLN0 of the memory chip 11_1 is calculated to be 100, and the tR+tDout total time of the plane PLN1 of the memory chip 11_1 is calculated to be 70. Then, from the calculation result, the NAND controller 29a sets the priority of the plane PLN0 of the memory chip 11_1 to the first place, the priority of the plane PLN0 of the memory chip 11_0 to the second place, the priority of the plane PLN1 of the memory chip 11_1 to the third place, and the priority of the plane PLN1 of the memory chip 11_0 to the fourth place.

The NAND controller 29a transmits a command in the command queue CQ to the channel scheduler 201. At this time, in a case where the planes PLN to be the targets of the commands are the same and the processes conflict, the NAND controller 29a does not transmit the next command until the previously executed process ends. Note that, in a case where the target page of the read operation executed previously and the target page of the read operation executed subsequently are the same (for example, in a case where only the target cluster CT is different in the same page PG), data read to the data register 114 in one cell read operation can be shared between these read operations, and thus these read operations are determined not to conflict.

In addition, when transmitting a command from the command queue CQ to the channel scheduler 201, the NAND controller 29a subdivides the command and transmits the subdivided command. Specifically, for example, the NAND controller 29a subdivides a read operation command "Read" into a cell read operation command "Sense" and a data output operation command "Dataout".

Moreover, the NAND controller 29a may integrate commands to be transmitted to the channel scheduler 201. For example, in the command queue CQ, when there are a plurality of read operation commands "Read" having the same target page PG and different clusters CT, the NAND controller 29a integrates a plurality of commands "Sense" into one integrated command "Sense", and transmits the integrated command "Sense" and a plurality of commands "Dataout" to the channel scheduler 201.

More specifically, for example, in response to the command "Read(A)" and the command "Read(D)" of the same target page PG, the NAND controller 29a transmits a command "Sense(A)", a command "Dataout(A)", and a command "Dataout(D)" to the channel scheduler 201. Note that the transmitted command "Sense(A)" is an integrated command of commands "Sense(A)" and "Sense(D)". The NAND controller 29a transmits a command "Sense(B)" and a command "Dataout(B)" obtained by subdividing the command "Read(B)" to the channel scheduler 201. In response to the command "Read(C)", the command "Read(G)", and the command "Read(I)" of the same target page PG, the NAND controller 29a transmits a command "Sense(C)", a command "Dataout(C)", a command "Dataout(G)", and a command "Dataout(I)" to the channel scheduler 201. In addition, the NAND controller 29a transmits a command "Sense(J)" and a command "Dataout(J)" obtained by subdividing the command "Read(J)" to the channel scheduler 201.

Since the other command conflicts with the previously transmitted command, the other commands are not transmitted to the channel scheduler 201 until the processing of the previously transmitted command is ended. For example, the target plane PLN of the command "Write(E)" is the same as that of the command "Read(C)" Therefore, the command "Write(E)" is not transmitted to the channel scheduler 201 until the processing of the command "Read(C)" is completed. The target page PG of the command "Read(F)" is different from that of the command "Read(B)", but the target plane PLN is the same as that of the command "Read(B)". Therefore, the command "Read(F)" is not transmitted to the channel scheduler 201 until the processing of the command "Read(B)" is completed. The target page PG of the command "Read(H)" is different from that of the command "Read(A)", but the target plane PLN is the same as that of the command "Read(A)". Therefore, the command "Read (H)" is not transmitted to the channel scheduler 201 until the processing of the command "Read(A)" is completed.

The channel scheduler 201 determines a command transmission order based on the priority. First, since the cell read operation can be executed in parallel across the planes PLN, the channel scheduler 201 sets the command "Sense(A)", the command "Sense(B)", the command "Sense(C)", and the command "Sense(J)" as the first to the fourth in the transmission order. Note that the order of the four may be changed. Next, the channel scheduler 201 sets the command "Dataout(C)", the command "Dataout(G)", and the command "Dataout(I)" corresponding to the plane PLN0 of the memory chip 11_1 having the first-place priority as the fifth to the seventh in the transmission order. Note that the order of the three may be changed. Next, the channel scheduler 201 sets the command "Dataout(A)" and the command "Dataout(D)" corresponding to the plane PLN0 of the memory chip 11_0 having the second-place priority as the eighth and the ninth in the transmission order. Note that the order of the two may be changed. Next, the channel scheduler 201 sets the command "Dataout(B)" corresponding to the plane PLN1 of the memory chip 11_1 having the third-place priority as the tenth in the transmission order. Then, the channel scheduler 201 sets the command "Dataout (J)" corresponding to the plane PLN1 of the memory chip 11_0 having the fourth-place priority as the eleventh in the transmission order.

3.4 Flow of Read Operation of Garbage Collection

Figure 17:
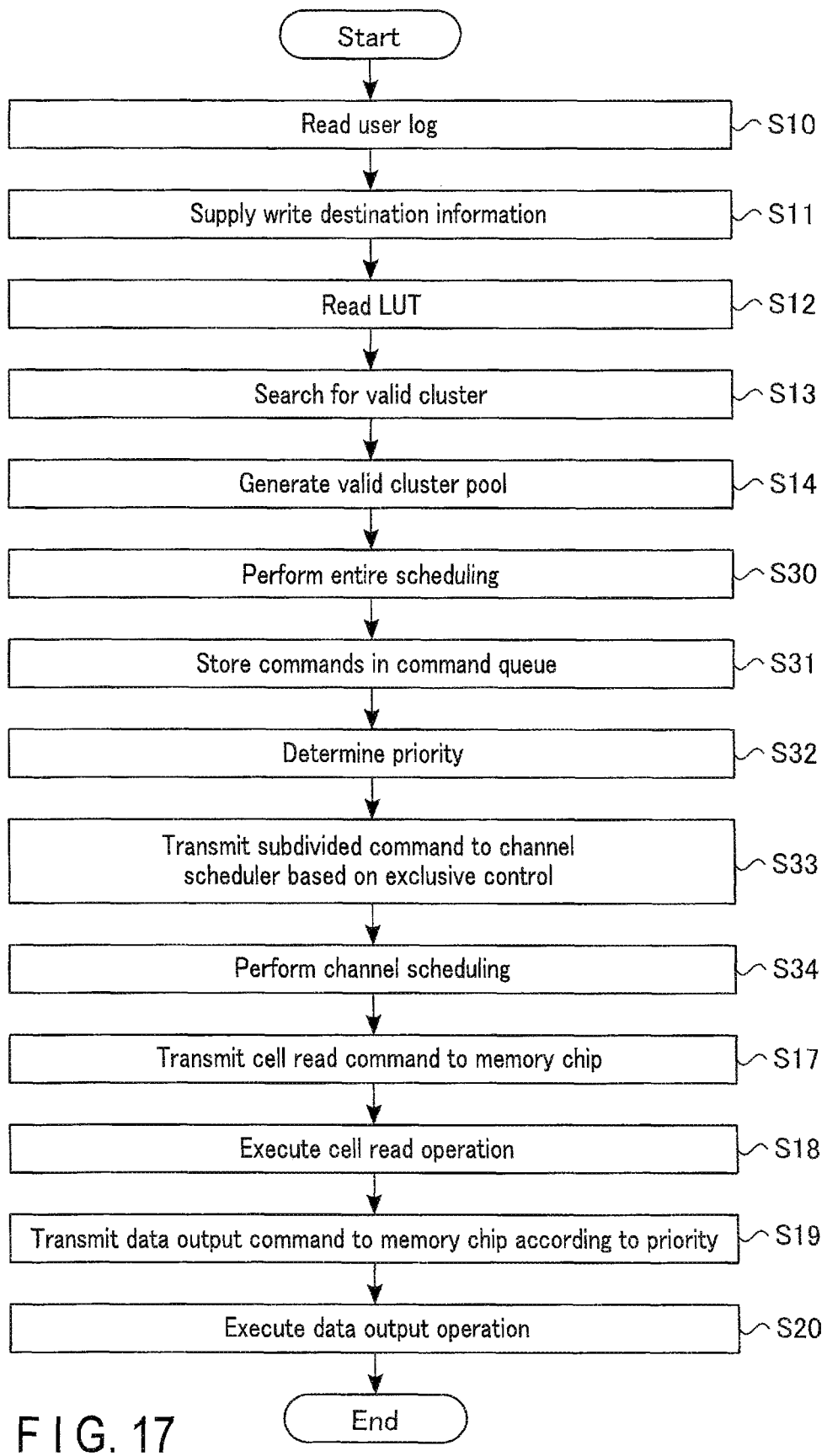
FIG. 17 is a flowchart illustrating an example of a read operation of garbage collection in the memory system according to the third embodiment.

Next, an example of a flow of the read operation of garbage collection will be described with reference to FIG. 17. FIG. 17 is a flowchart illustrating an example of the read operation of garbage collection.

The procedures from steps S10 to S14 are similar to the procedures in the first embodiment described with reference to FIG. 11.

After step S14, the scheduler 28 performs entire scheduling (S30). More specifically, the scheduler 28 receives commands of various operations such as a write operation, a read operation, a data erase operation, and garbage collection from the CPU 22. The scheduler 28 determines the schedule of these operations for each channel CH.

The commands are stored in the command queue CQ corresponding to each channel CH based on the result of the scheduling (S31).

The NAND controller 29a refers to the corresponding command queue CQ and determines the priority of the data output operation for each plane PLN (S32). The NAND controller 29a transmits the determined priority to the channel scheduler 201.

The NAND controller 29a transmits commands obtained by subdividing the command of the command queue CQ to the channel scheduler 201 based on the exclusive control (S33).

The channel scheduler 201 executes scheduling of the received commands based on the priority (S34).

The procedures from steps S17 to S20 are similar to the procedures in the first embodiment described with reference to FIG. 11.

3.5 Advantages of Present Embodiment

With the configuration according to the present embodiment, the same advantages as those of the first embodiment can be obtained.

Note that, in the present embodiment, similarly to the first embodiment, the case where the priority of the four planes PLN is determined from the first place to the fourth place has been described, but the present invention is not limited thereto. For example, as in the second embodiment, a plane PLN having the highest priority may be determined, and other planes PLN may have the same priority.

4. Modifications

According to above embodiment, a memory system includes: nonvolatile memory (10) that includes a plurality of memory areas (PLN) including at least a first memory area (PLN0) and a second memory area (PLN1) different from the first memory area, each of the plurality of memory areas including a memory cell array (111); and a memory controller (20) configured to control the nonvolatile memory. A read operation includes a first operation (a cell read operation) of reading data from the memory cell array and a second operation (a data output operation) of transmitting at least a part of the read data from the nonvolatile memory to the memory controller. The memory controller is configured to, when executing the read operation in the first memory area and the read operation in the second memory area in parallel, determine priorities of the second operation in the first memory area and the second operation in the second memory area, based on a result of comparison between (A) a first total time period (tR+tDout total time) required for the first operation (tR) and the second operation (tDout) in the first memory area and (B) a second total time period (tR+tDout total time) required for the first operation (tR) and the second operation (tDout) in the second memory area.

According to the above embodiments, it is possible to provide a memory system with improved processing capability.

Note that the embodiments are not limited to the forms described above, and various modifications are possible.

For example, in the first embodiment, the case where the four planes PLN0 to PLN3 of the memory chip 11 execute the read operation of the valid cluster CT has been described, but the present embodiments are not limited thereto. For example, the plane PLN of each of four memory chips 11_0 to 11_3 coupled to the channel CH0 may execute the read operation of the valid cluster CT.

For example, in the above embodiments, the read operation in the garbage collection has been described, but the present embodiments are not limited thereto. The above embodiments can be applied to any read operation that is executed in parallel in a plurality of planes PLN coupled to a channel CH.

Note that, the "coupling" in the above embodiments also includes a state in which the coupling is indirectly made with something else, for example, a transistor or a resistor, being interposed in between.

While several embodiments have been described, these embodiments have been presented by way of example and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A memory system comprising:
a nonvolatile memory that includes a plurality of memory areas including at least a first memory area and a second memory area different from the first memory area, each of the plurality of memory areas including a memory cell array; and
a memory controller configured to control the nonvolatile memory,
wherein
a read operation includes a first operation of reading data from the memory cell array and a second operation of transmitting at least a part of the read data from the nonvolatile memory to the memory controller, and
the memory controller is configured to, when executing the read operation in the first memory area and the read operation in the second memory area in parallel;
calculate a first total time period required for the first operation and the second operation in the first memory area, based on a first search result of a valid cluster to be read from the first memory area by the read operation;
calculate a second total time period required for the first operation and the second operation in the second memory area, based on a second search result of a valid cluster to be read from the second memory area by the read operation; and
determine priorities of the second operation in the first memory area and the second operation in the second memory area, based on a result of comparison between the first total time period required for the first operation and the second operation in the first memory area and the second total time period.

2. The memory system according to claim 1, wherein the first total time period is calculated based on the number of times of executing the first operation in the first memory area and the number of valid clusters in the first memory area.

3. The memory system according to claim 1, wherein data of a page read from the memory cell array by the first operation includes at least a valid cluster.

4. The memory system according to claim 1, wherein the memory controller is configured to transmit the valid cluster from the nonvolatile memory to the memory controller by the second operation.

5. The memory system according to claim 1, wherein the valid cluster includes valid data associated with a logical address.

6. The memory system according to claim 5, wherein the memory controller is configured to, in an operation of searching for the valid cluster,
compare (A) a first table indicating a physical address of the nonvolatile memory mapped to the logical address with (B) a log indicating a data write status in the nonvolatile memory; and
generate a second table indicating the physical address corresponding to the valid cluster.

7. The memory system according to claim 1, wherein the memory controller is further configured to adjust a schedule such that the second operation in the first memory area is preferentially executed over the second operation in the second memory area when the first total time period is longer than the second total time period.

8. A memory system comprising:
a nonvolatile memory that includes a plurality of memory areas including at least a first memory area, a second memory area different from the first memory area, and a third memory area different from the first memory area and the second memory area; and
a memory controller configured to control the nonvolatile memory,
wherein
a read operation includes a first operation of reading data from the memory cell array and a second operation of transmitting at least a part of the read data from the nonvolatile memory to the memory controller, and
the memory controller is configured to, when executing the read operation in the first memory area, the read operation in the second memory area, and the read operation in the third memory area in parallel;
compare (A) a first total time period required for the first operation and the second operation in the first memory area, (B) a second total time period required for the first operation and the second operation in the second memory area, and (C) a third total time period required for the first operation and the second operation in the third memory area; and
increase priorities of the second operation in the first memory area, the second operation in the second memory area, and the second operation in the third memory area in descending order of the first total time period, the second total time period, and the third total time period.

9. The memory system according to claim 8, wherein the memory controller is further configured to, when executing the read operation in the first memory area, the read operation in the second memory area, and the read operation in the third memory area in parallel,
make priority of any one of the second operation in the first memory area, the second operation in the second memory area, and the second operation in the third memory area higher than the other two, based on a result of comparing (A) the first total time period, (B) the second total time period, and (C) the third total time period.

10. A memory system comprising:
a nonvolatile memory that includes a plurality of memory areas including at least a first memory area and a second memory area different from the first memory area, each of the plurality of memory areas including a memory cell array and a data register; and
a memory controller configured to control the nonvolatile memory,
wherein
a read operation includes a first operation of reading data from the memory cell array and a second operation of transmitting at least a part of the read data from the nonvolatile memory to the memory controller, the first operation being an operation in which data read from the memory cell array is stored in the data register, the second operation being an operation in which data read from the data register is transmitted to the memory controller, and
the memory controller is configured to, when executing the read operation in the first memory area and the read operation in the second memory area in parallel:
determine priorities of the second operation in the first memory area and the second operation in the second memory area, based on a result of comparison between (A) a first total time period required for the first operation and the second operation in the first memory area and (B) a second total time period required for the first operation and the second operation in the second memory area;

in a case where data to be read to the memory controller is stored in the data register of the first memory area and the data register of the second memory area, and when determining that the priority of the second operation in the first memory area is higher than the priority of the second operation in the second memory area, cause the second memory area to stand by until execution of the second operation in the first memory area is completed; and execute the second operation in the second memory area after the execution of the second operation in the first memory area is completed.

11. The memory system according to claim 10, wherein the data read from the memory cell array in the first operation has a first size, and the data read from the data register in the second operation has a second size smaller than the first size.

12. The memory system according to claim 1, wherein the first memory area includes the memory cell array, a sense amplifier, and a row decoder.

13. The memory system according to claim 8, wherein the memory controller is further configured to, when executing the read operation in the first memory area, the read operation in the second memory area, and the read operation in the third memory area in parallel, make priority of one of the second operation in the first memory area, the second operation in the second memory area, and the second operation in the third memory area the highest among the three, based on at least one of (A) the first total time period, (B) the second total time period, and (C) the third total time period; and make priorities of the other two of the second operation in the first memory area, the second operation in the second memory area, and the second operation in the third memory, based on a round-robin manner.

14. The memory system according to claim 8, wherein the memory controller is configured to:

calculate the first total time period based on a first search result of a valid cluster to be read from the first memory area by the read operation;

calculate the second total time period based on a second search result of a valid cluster to be read from the second memory area by the read operation; and calculate the third total time period based on a third search result of a valid cluster to be read from the third memory area by the read operation.

15. The memory system according to claim 10, wherein the memory controller is configured to calculate the first total time period based on a first search result of a valid cluster to be read from the first memory area by the read operation, and calculate the second total time period based on a second search result of a valid cluster to be read from the second memory area by the read operation.

16. The memory system according to claim 10, wherein the memory controller includes a command queue configured to store a plurality of first commands to be executed in the first memory area and a plurality of second commands to be executed in the second memory area, and is further configured to determine the priority based on the first commands and the second commands.

17. The memory system according to claim 16, wherein the memory controller is configured to calculate the first total time period based on the first commands stored in the command queue, and calculate the second total time period based on the second commands stored in the command queue.

18. The memory system according to claim 16, wherein the memory controller is configured to adjust a schedule such that the first commands are transmitted from the command queue to the nonvolatile memory before the second commands when the first total time period is longer than the second total time period.

19. The memory system according to claim 18, wherein the memory controller is further configured to generate a plurality of third commands obtained by subdividing each of the first commands and each of the second commands, and transmit the plurality of third commands to the nonvolatile memory.

20. The memory system according to claim 19, wherein the first commands include a fourth command corresponding to the read operation in the first memory area, and the subdivided third commands include a fifth command subdivided from the fourth command and corresponding to the first operation in the first memory area and a sixth command subdivided from the fourth command and corresponding to the second operation in the first memory area.

* * * * *